(12) United States Patent
Yamamoto et al.

(10) Patent No.: US 11,153,466 B2
(45) Date of Patent: *Oct. 19, 2021

(54) VIDEO DISPLAY APPARATUS AND VIDEO DISPLAY METHOD

(71) Applicant: PANASONIC INTELLECTUAL PROPERTY MANAGEMENT CO., LTD., Osaka (JP)

(72) Inventors: Masaya Yamamoto, Kyoto (JP); Masayuki Kozuka, Osaka (JP); Yoshiichiro Kashiwagi, Kyoto (JP); Toshiroh Nishio, Osaka (JP); Kazuhiko Kouno, Osaka (JP); Hiroshi Yahata, Osaka (JP); Takeshi Hirota, Osaka (JP); Yoshihiro Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/331,464

(22) PCT Filed: Feb. 26, 2018

(86) PCT No.: PCT/JP2018/006857
§ 371 (c)(1),
(2) Date: Mar. 7, 2019

(87) PCT Pub. No.: WO2018/235338
PCT Pub. Date: Dec. 27, 2018

(65) Prior Publication Data
US 2019/0222818 A1 Jul. 18, 2019

Related U.S. Application Data

(60) Provisional application No. 62/523,069, filed on Jun. 21, 2017.

(51) Int. Cl.
*G06T 5/00* (2006.01)
*G06T 5/20* (2006.01)
(Continued)

(52) U.S. Cl.
CPC ............... *H04N 5/20* (2013.01); *G06T 5/009* (2013.01); *G06T 5/20* (2013.01); *H04N 5/44504* (2013.01);
(Continued)

(58) Field of Classification Search
CPC .. H04N 5/20; H04N 5/44504; H04N 5/44543; H04N 5/66; H04N 9/793;
(Continued)

(56) References Cited

U.S. PATENT DOCUMENTS

2013/0038790 A1   2/2013  Seetzen et al.
2014/0210847 A1*  7/2014  Knibbeler .............. G11B 20/10
                                                345/589
(Continued)

FOREIGN PATENT DOCUMENTS

JP    2016-100039 A    5/2016
JP    6104411 B2       3/2017
(Continued)

OTHER PUBLICATIONS

White Paper Blu-ray Disc Read-Only Format (Ultra HD Blu-ray), Audio Visual Application Format Specifications for BD-ROM Version 3.1, Aug. 2016, http://www.blu-raydisc.com/Assets/Downloadablefile/BD-ROM_Part3_V3.1_WhitePaper_160729_clean.pdf.
(Continued)

*Primary Examiner* — Thai Q Tran
*Assistant Examiner* — Nienru Yang
(74) *Attorney, Agent, or Firm* — McDermott Will and Emery LLP

(57) ABSTRACT

A video display apparatus includes: a tone mapping processor that performs a tone mapping process of converting a
(Continued)

luminance of a video by using conversion characteristics according to a maximum luminance of the video; and a display that displays the video that has undergone the tone mapping process. The tone mapping processor switches between a first tone mapping process of dynamically changing the conversion characteristics according to a time-dependent change in the maximum luminance of the video and a second tone mapping process that is performed using constant conversion characteristics irrespective of the time-dependent change in the maximum luminance of the video.

7 Claims, 25 Drawing Sheets

(51) Int. Cl.

| | | |
|---|---|---|
| *H04N 9/793* | (2006.01) | |
| *H04N 5/20* | (2006.01) | |
| *H04N 5/445* | (2011.01) | |
| *H04N 21/431* | (2011.01) | |
| *H04N 21/4402* | (2011.01) | |
| *H04N 9/82* | (2006.01) | |
| *H04N 5/66* | (2006.01) | |
| *H04N 21/47* | (2011.01) | |

(52) U.S. Cl.
CPC .............. *H04N 5/66* (2013.01); *H04N 9/793* (2013.01); *H04N 9/8205* (2013.01); *H04N 21/4312* (2013.01); *H04N 21/4402* (2013.01); *H04N 21/47* (2013.01); *G06T 2207/20208* (2013.01)

(58) Field of Classification Search
CPC .............. H04N 9/8205; H04N 21/4312; H04N 21/4402; G06T 5/009; G06T 5/20; G06T 2207/20208
USPC ......................................................... 386/306
See application file for complete search history.

(56) References Cited

U.S. PATENT DOCUMENTS

| | | |
|---|---|---|
| 2015/0256860 A1 | 9/2015 | Kunkel et al. |
| 2016/0005201 A1 | 1/2016 | Kunkel et al. |
| 2016/0080716 A1 | 3/2016 | Atkins et al. |
| 2016/0100147 A1 | 4/2016 | Kim et al. |
| 2016/0212399 A1 | 7/2016 | Uchimura |
| 2016/0330513 A1 | 11/2016 | Toma et al. |
| 2017/0186141 A1 | 6/2017 | Ha et al. |
| 2017/0243612 A1 | 8/2017 | Yahata et al. |
| 2017/0251161 A1 | 8/2017 | Toma et al. |
| 2017/0330312 A1 | 11/2017 | Nam |
| 2018/0018932 A1 | 1/2018 | Atkins |
| 2018/0278985 A1 | 9/2018 | De Haan et al. |
| 2018/0376194 A1 | 12/2018 | Oh |
| 2019/0020852 A1 | 1/2019 | Bak et al. |
| 2019/0043233 A1 | 2/2019 | Kim et al. |
| 2019/0251680 A1 | 8/2019 | Kozuka et al. |
| 2019/0335149 A1 | 10/2019 | Hirota et al. |
| 2019/0394384 A1 | 12/2019 | Yamamoto et al. |
| 2020/0236334 A1 | 7/2020 | Hirota et al. |
| 2020/0258543 A1 | 8/2020 | Yahata et al. |

FOREIGN PATENT DOCUMENTS

| | | | |
|---|---|---|---|
| WO | 2014/130213 A1 | 8/2014 | |
| WO | 2016/027423 A1 | 2/2016 | |
| WO | WO-2016074999 A1 * | 5/2016 | ....... H04N 21/42653 |

OTHER PUBLICATIONS

International Search Report and Written Opinion dated May 15, 2018 in International Patent Application No. PCT/JP2018/006856; with partial English translation.
International Search Report and Written Opinion dated May 15, 2018 in International Patent Application No. PCT/JP2018/006857; with partial English translation.
Non-Final Office Action issued in corresponding U.S. Appl. No. 16/331,456, dated Feb. 19, 2020.
Notice of Allowance issued in U.S. Appl. No. 16/332,738, dated Jul. 1, 2020.
Non-Final Office Action issued in corresponding U.S. Appl. No. 16/333,885, dated May 14, 2020.
Extended European Search Report issued in corresponding European Patent Application No. 18820540.5, dated Apr. 30, 2020.
Extended European Search Report issued in corresponding European Patent Application No. 18820085.1, dated May 4, 2020.
Extended Search Report issued in European Patent Application No. 18831862.0, dated Apr. 24, 2020.
Extended Search Report issued in European Patent Application No. 18831863.8, dated Apr. 29, 2020.
International Search Report and Written Opinion issued in International Patent Application No. PCT/JP2018/006860, dated May 15, 2018; with partial English translation.
International Search Report and Written Opinion issued in International Patent Application No. PCT/JP2018/006861, dated May 15, 2018; with partial English translation.
International Search Report and Written Opinion issued in International Patent Application No. PCT/JP2018/006862, dated May 15, 2018; with partial English translation.
International Search Report and Written Opinion issued in International Patent Application No. PCT/JP2018/006863, dated May 15, 2018; with partial English translation.
Non-Final Office Action issued in U.S. Appl. No. 16/332,751, dated Oct. 16, 2020.
Extended European Search Report issued in European Patent Application No. 18852740.2, dated Nov. 2, 2020.
Extended European Search Report issued in European Patent Application No. 18852787.3, dated Nov. 2, 2020.
Non-Final Office Action issued in U.S. Appl. No. 16/333,894, dated Oct. 28, 2020.

* cited by examiner

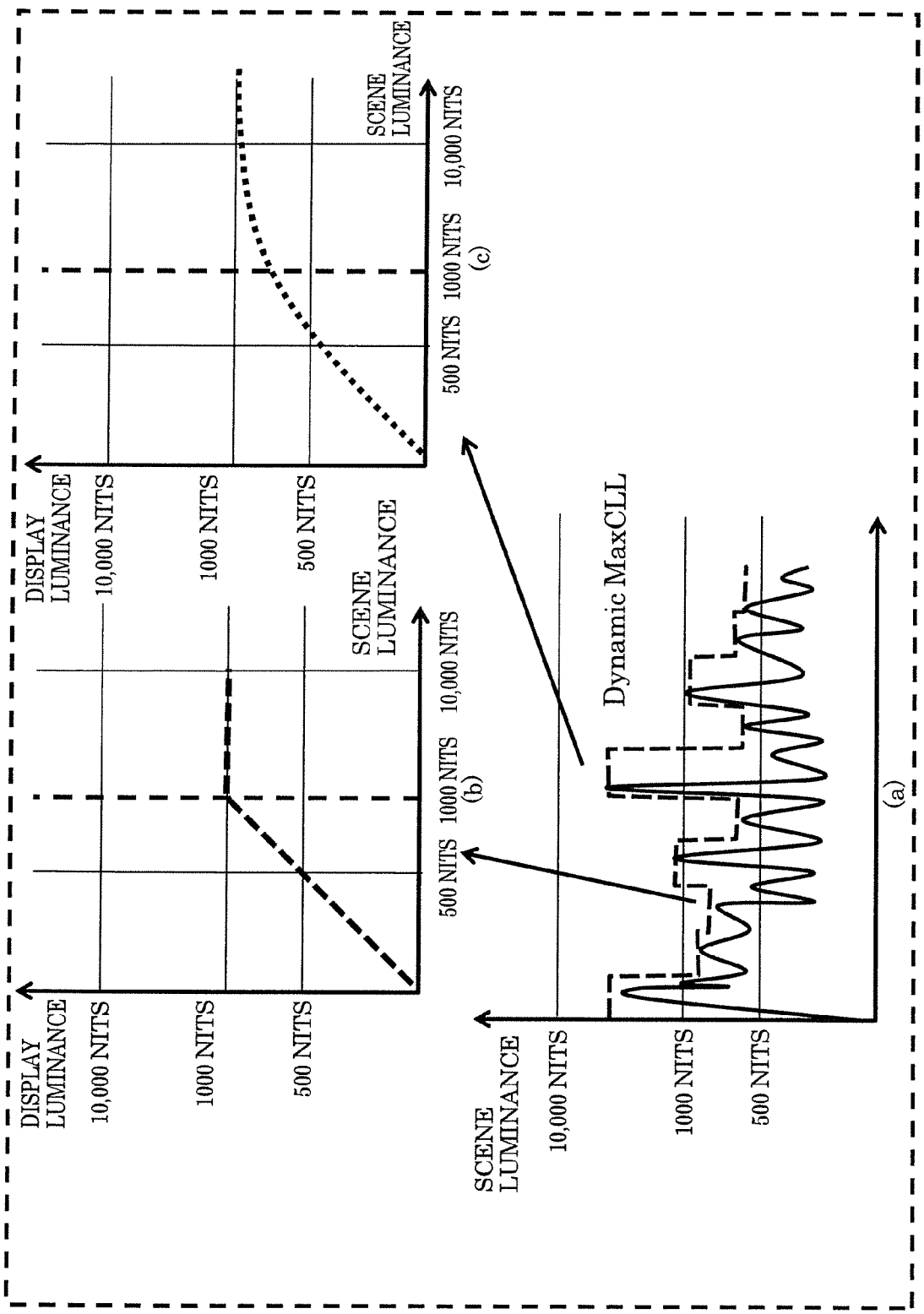

FIG. 8A

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | | ON | ON OR OFF |

FIG. 8B

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | SUBTITLES OVERLAY FLAG | ON | ON OR OFF |
| | MENU OVERLAY FLAG | OFF | ON OR OFF |

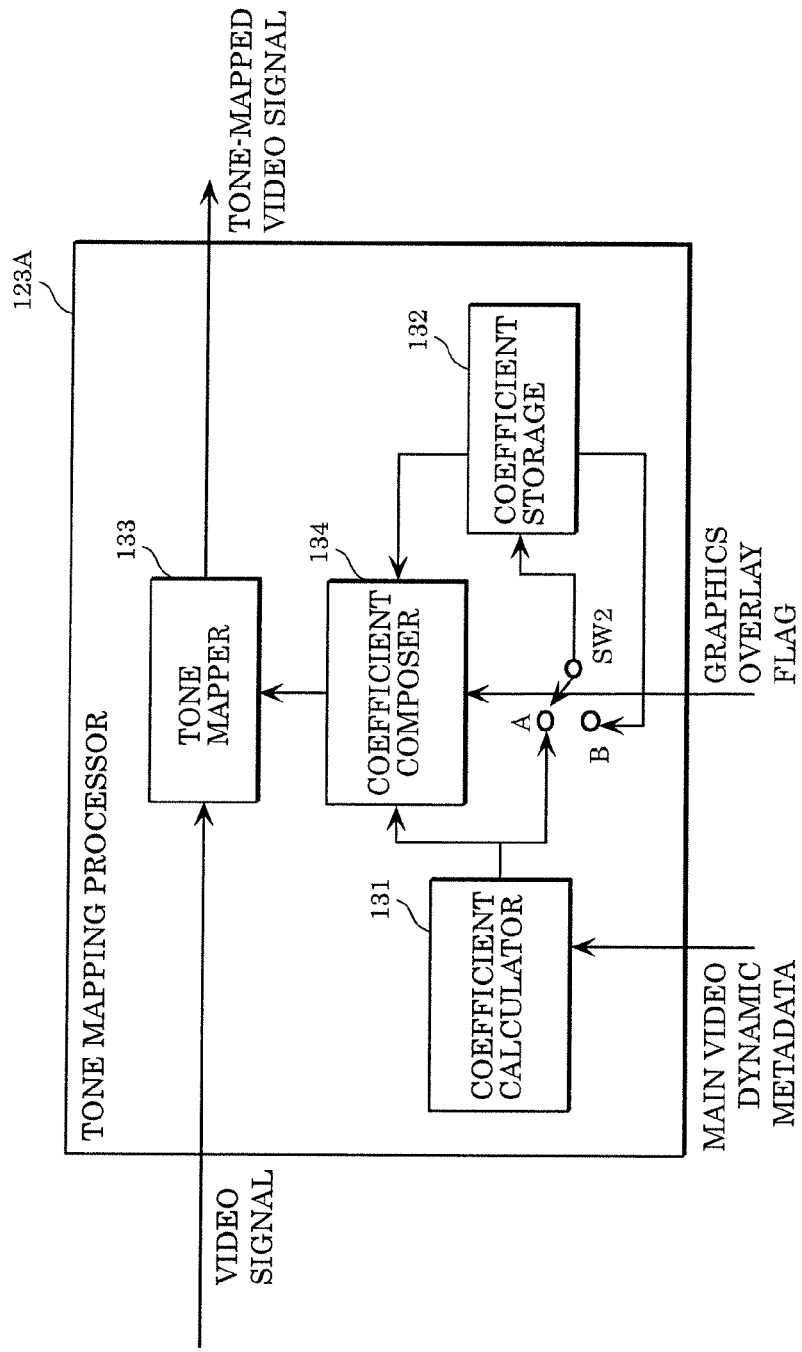

FIG. 12A

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | | ON | ON OR OFF |
| GRAPHICS LUMINANCE INFORMATION | | 250 | NIT |

FIG. 12B

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS OVERLAY FLAG | SUBTITLES OVERLAY FLAG | ON | ON OR OFF |
| | MENU OVERLAY FLAG | ON | ON OR OFF |
| GRAPHICS LUMINANCE INFORMATION | MAXIMUM SUBTITLES LUMINANCE | 250 | NIT |
| | MAXIMUM MENU LUMINANCE | 300 | NIT |

FIG. 13A

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
|  | AVERAGE LUMINANCE | 200 | NIT |
| GRAPHICS LUMINANCE INFORMATION |  | 0 | GRAPHICS ARE PRESENT, BUT LUMINANCE IS NOT KNOWN |
|  |  | 1 | GRAPHICS ARE NOT PRESENT (CORRESPONDING TO GRAPHICS SUPERIMPOSITION FLAG BEING OFF) |
|  |  | 2 | GRAPHICS ARE PRESENT AT LUMINANCE OF 8 NITS |
|  |  | 255 | GRAPHICS ARE PRESENT AT LUMINANCE OF 1020 NITS OR MORE |

FIG. 13B

| ITEM | SUBITEM | EXAMPLE VALUE | UNIT, LIMITATION, ETC. |
|---|---|---|---|
| MAIN VIDEO DYNAMIC METADATA | MAXIMUM LUMINANCE | 550 | NIT |
| | AVERAGE LUMINANCE | 200 | NIT |
| GRAPHICS LUMINANCE INFORMATION | MAXIMUM SUBTITLES LUMINANCE | 0 | SUBTITLES ARE PRESENT, BUT LUMINANCE IS NOT KNOWN |
| | | 1 | SUBTITLES ARE NOT PRESENT (CORRESPONDING TO SUBTITLES SUPERIMPOSITION FLAG BEING OFF) |
| | | 2 | SUBTITLES ARE PRESENT AT LUMINANCE OF 4 NITS |
| | | 255 | SUBTITLES ARE PRESENT AT LUMINANCE OF 510 NITS OR MORE |
| | MAXIMUM MENU LUMINANCE | 0 | MENU IS PRESENT, BUT LUMINANCE IS NOT KNOWN |
| | | 1 | MENU IS NOT PRESENT (CORRESPONDING TO MENU SUPERIMPOSITION FLAG BEING OFF) |
| | | 2 | MENU IS PRESENT AT LUMINANCE OF 8 NITS |
| | | 255 | MENU IS PRESENT AT LUMINANCE OF 1020 NITS OR MORE |

FIG. 20

| ITEM | SUBITEM | EXAMPLE VALUE | UNIT, LIMITATION, ETC. |
|---|---|---|---|
| LUMINANCE INFORMATION OF VIDEO DISPLAY APPARATUS | MAXIMUM LUMINANCE | 1000 | NIT |
| | MAXIMUM FULL-DISPLAY LUMINANCE | 600 | NIT |
| TONE MAPPING INFORMATION OF VIDEO DISPLAY APPARATUS | LUMINANCE AT INFLECTION POINT 1 (A) | 600 | NIT, LUMINANCE AT WHICH TONE MAPPING IS NOT PERFORMED |
| | LUMINANCE AT INFLECTION POINT 2 (B) | 900 | NIT |
| | INCREASE AT INFLECTION POINT 2 (B) | 120 | %, INCREASE OF SLOPE FROM LINE BETWEEN INFLECTION POINT 1 (A) AND MAXIMUM LUMINANCE POINT (C) |

VIDEO DISPLAY APPARATUS AND VIDEO DISPLAY METHOD

CROSS-REFERENCE OF RELATED APPLICATIONS

This application is the U.S. National Phase under 35 U.S.C. § 371 of International Patent Application No. PCT/JP2018/006857, filed on Feb. 26, 2018, which in turn claims the benefit of U.S. Patent Provisional Application No. 62/523,069, filed on Jun. 21, 2017, the entire disclosures of which Applications are incorporated by reference herein.

TECHNICAL FIELD

The present disclosure relates to a video display apparatus and a video display method for displaying a video.

BACKGROUND ART

Patent Literature (PTL) 1 discloses a method and a system for mapping graphics on an image of an HDR (High Dynamic Range) video.

CITATION LIST

Patent Literature

PTL 1: Japanese Patent No. 6104411

Non-Patent Literature

NPL 1: White Paper Blu-ray Disc Read-Only Format (Ultra HD Blu-ray), Audio Visual Application Format Specifications for BD-ROM Version 3.1, August 2016, http://www.blu-raydisc.com/Assets/Downloadablefile/BD-ROM_Part3_V3.1_WhitePa per_160729_clean.pdf

SUMMARY OF THE INVENTION

Technical Problem

The present disclosure provides a video display apparatus and a video display method that can improve the quality of a video displayed.

Solution to Problem

A video display apparatus according to an aspect of the present disclosure includes: a tone mapping processor that performs a tone mapping process of converting a luminance of a video by using conversion characteristics according to a maximum luminance of the video; and a display that displays the video that has undergone the tone mapping process. The tone mapping processor switches between a first tone mapping process of dynamically changing the conversion characteristics according to a time-dependent change in the maximum luminance of the video and a second tone mapping process that is performed using constant conversion characteristics irrespective of the time-dependent change in the maximum luminance of the video.

Advantageous Effect of Invention

The present disclosure can provide a video display apparatus and a video display method that can improve the quality of a video displayed.

BRIEF DESCRIPTION OF DRAWINGS

FIG. 4B is a diagram showing an example of dynamic tone mapping.

FIG. 8A is a diagram showing an example of main video dynamic metadata and a graphics overlay flag according to Embodiment 1.

FIG. 8B is a diagram showing an example of main video dynamic metadata and a graphics overlay flag according to Embodiment 1.

FIG. 10 is a block diagram of a tone mapping processor according to a variation of Embodiment 1.

FIG. 12A is a diagram showing an example of main video dynamic metadata, a graphics overlay flag, and graphics luminance information according to Embodiment 2.

FIG. 12B is a diagram showing an example of main video dynamic metadata, a graphics overlay flag, and graphics luminance information according to Embodiment 2.

FIG. 13A is a diagram showing an example of main video dynamic metadata, a graphics overlay flag, and graphics luminance information according to Embodiment 2.

FIG. 13B is a diagram showing an example of main video dynamic metadata, a graphics overlay flag, and graphics luminance information according to Embodiment 2.

FIG. 20 is a diagram showing an example of tone mapping information according to Embodiment 5.

DESCRIPTION OF EXEMPLARY EMBODIMENTS

[1-1. Background]

Figure 1:
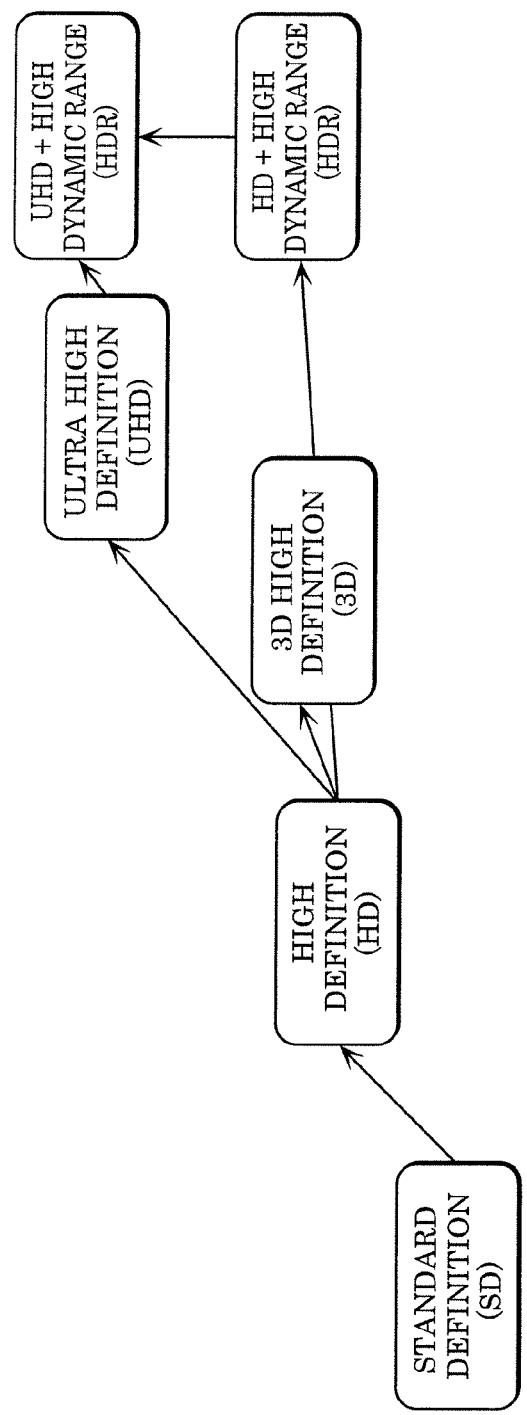
FIG. 1 is a diagram illustrating the evolution of imaging technology.

First, the transition of imaging technology will be described with reference to FIG. 1. FIG. 1 is a diagram illustrating the evolution of imaging technology.

In order to enhance video image quality, the focus has been given to increase the number of pixels displayed. Accordingly, standard definition (SD) videos (720×480 pixels) and high definition (HD) videos (1920×1080 pixels) are now widely used.

In recent years, in order to achieve even higher image quality, introduction of ultra high definition (UHD) videos (3840×1920 pixels), or so-called 4K resolution videos (with a 4K resolution of 4096×2048 pixels) has started.

Along with the introduction of 4K resolution videos, consideration is also given to expanding the dynamic range, expanding the color gamut, adding or improving the frame rate, and the like.

Among these, with respect to the dynamic range, HDR (High Dynamic Range) rendering is receiving increased attention as a method for representing bright light, such as specular reflection light, that cannot be represented by a currently used television signal to be more close to reality while maintaining low light signal gradation. Specifically, conventional television signals are called SDR (Standard Dynamic Range) signals, and the highest luminance is 100 nits. In contrast, in HDR signals, the highest luminance is expected to be up to 1000 nits or more. For HDR signals, standardization of mastering display standards is currently undertaken by SMPTE (Society of Motion Picture & Television Engineers), ITU-R (International Telecommunications Union Radio communications Sector), and the like.

Specific applications of HDR include, as with HD and UHD, broadcasting, packaged media (Blu-ray® disc, and the like), internet delivery, and the like.

[1-2. Relationship Between Generation of Master, Delivery Methods, and Display Apparatuses]

Figure 2:
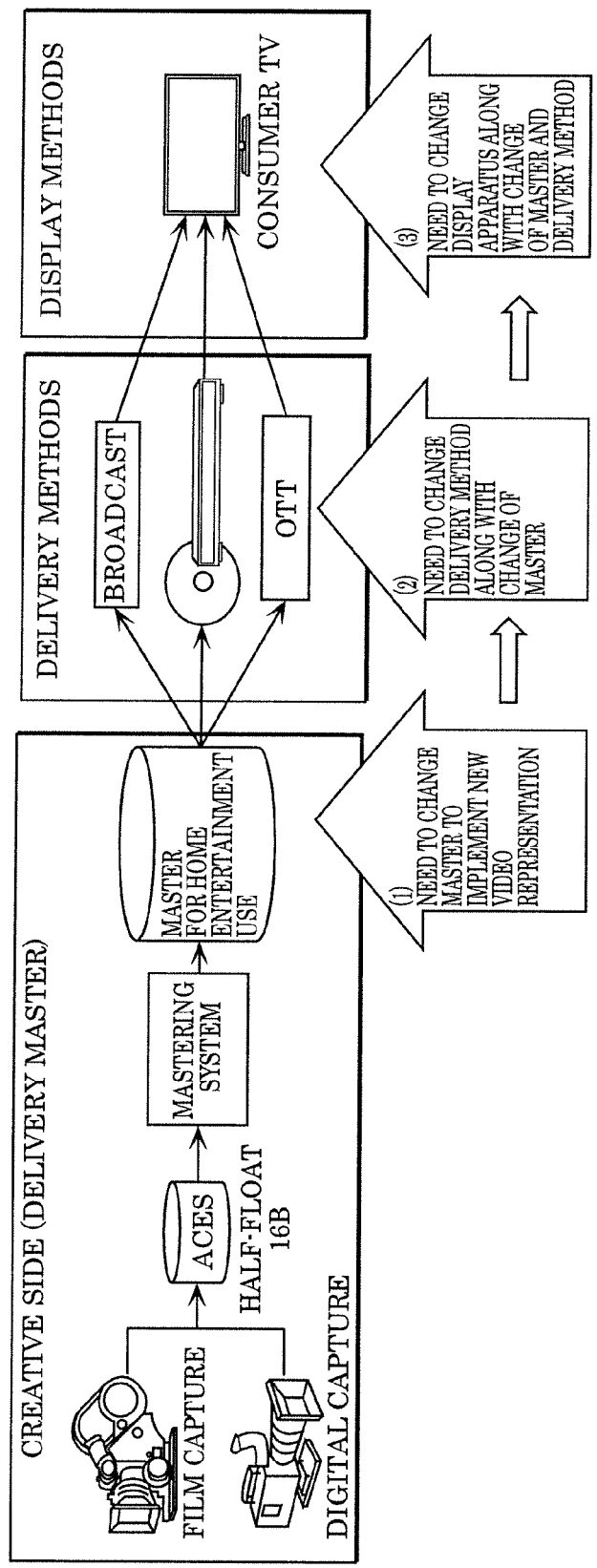
FIG. 2 is a diagram illustrating the relationship between video production, delivery methods, and display apparatuses when a new video representation is introduced into content.

FIG. 2 is a diagram illustrating the relationship between video production, delivery methods, and display apparatuses when a new video representation is introduced into content.

In the case where a new video representation is introduced (for example, the number of pixels is increased) so as to enhance video image quality, as shown in FIG. 2, it is necessary to (1) change a master for home entertainment on the video production side. Along with this change, it is also necessary to (2) update the delivery method such as broadcasting, communication, or a packaged medium, and also (3) update the display apparatus such as a television set or a projector for displaying the video.

[1-3. Tone Mapping]

Tone mapping is processing for adjusting, based on the relationship between the luminance of an HDR video and the maximum luminance (Display Peak Luminance: DPL) of a video display apparatus, the luminance of the video to be less than or equal to DPL by converting the luminance of the video if the maximum luminance (Maximum Content Luminance Level: MaxCLL) of the video exceeds DPL. Through this processing, the video can be displayed without losing information near the maximum luminance of the video. The conversion depends on the characteristics of the video display apparatus, and also depends on how to display the video, and thus different conversion characteristics are used for each video display apparatus.

Figure 3A:
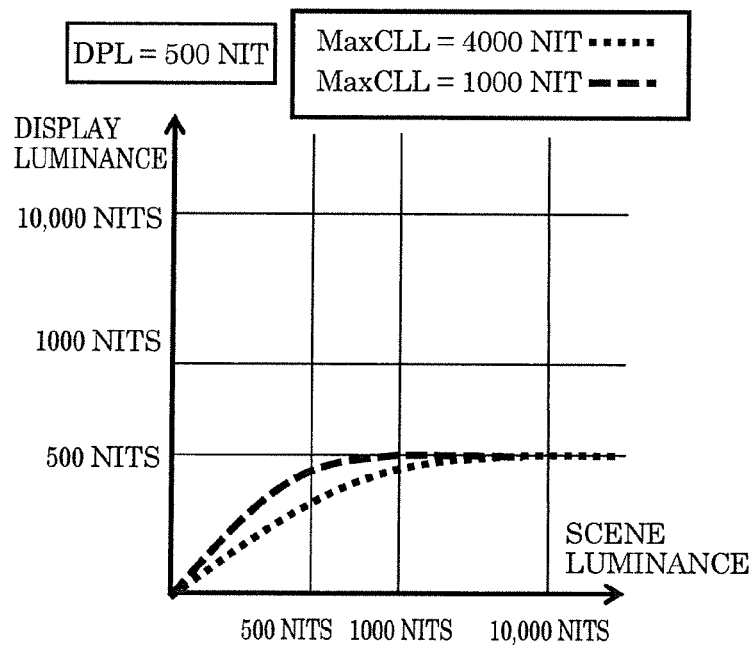
FIG. 3A is a diagram showing an example of tone mapping.
Figure 3B:
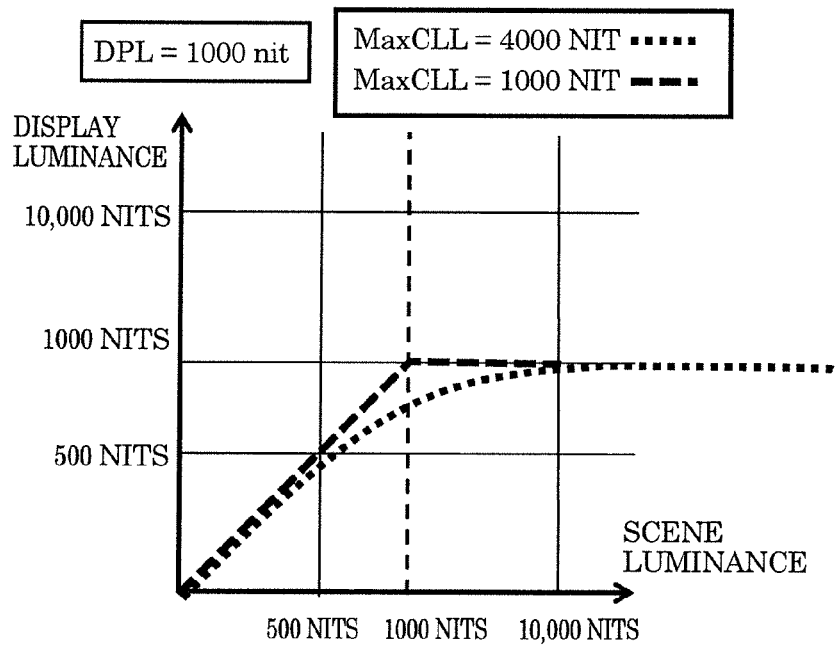
FIG. 3B is a diagram showing an example of tone mapping.

FIGS. 3A and 3B are diagrams showing examples of tone mapping. FIG. 3A shows a case where DPL is 500 nits, and FIG. 3B shows a case where DPL is 1000 nits. Also, FIGS. 3A and 3B each show an example of tone mapping performed when a video having a MaxCLL of 1000 nits is displayed and an example of tone mapping performed when a video having a MaxCLL of 4000 nits is displayed.

As shown in FIG. 3A, in the case where DPL is 500 nits, in both videos, the luminance is converted such that the video can be displayed at up to MaxCLL below 500 nits, but the degree of conversion is higher in the video having a higher MaxCLL.

As shown in FIG. 3B, in the case where DPL is 1000 nits, in the video having a MaxCLL of 1000 nits, tone mapping is not performed. In the video having a MaxCLL of 4000 nits, tone mapping is performed so as to convert the luminance from 4000 nits to 1000 nits, and the video is displayed at that luminance.

[1-4. Dynamic Metadata and Dynamic Tone Mapping]

Figure 4A:
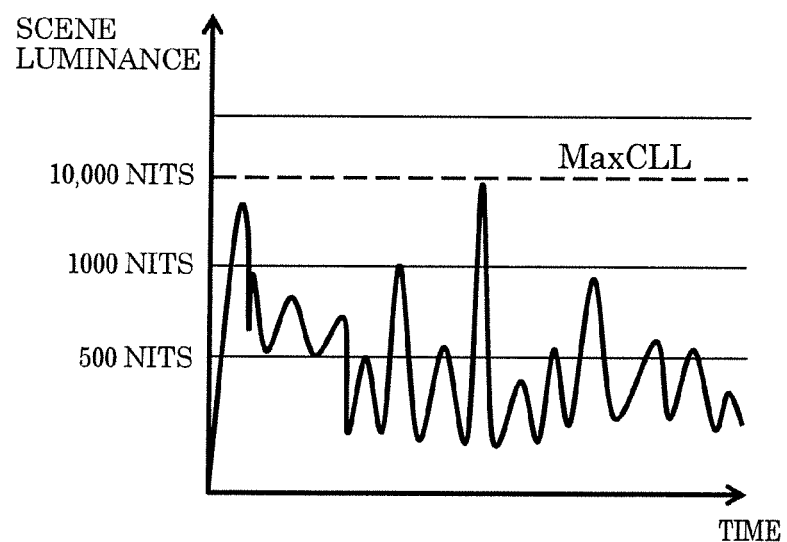
FIG. 4A is a diagram showing an example of static tone mapping.

FIG. 4A is a diagram showing an example of tone mapping using static metadata. FIG. 4B is a diagram showing an example of dynamic tone mapping using dynamic metadata.

As shown in FIG. 4A, in the case where static metadata (MaxCLL) is used, MaxCLL indicates the highest luminance in a video sequence, and thus the video display apparatus can only perform tone mapping using a fixed curve on the video sequence. In contrast, as shown in (a) in FIG. 4B, in the case where metadata suitable according to the luminance that varies with time (here, referred to as Dynamic MaxCLL) is used, the video display apparatus does not perform tone mapping when the luminance is low ((b) in FIG. 4B), and performs tone mapping when the luminance is high ((c) in FIG. 4B). In this way, optimal tone mapping suitable for the luminance that varies with time can be implemented.

[1-5. Overlaying Graphics on Video]

Figure 5:
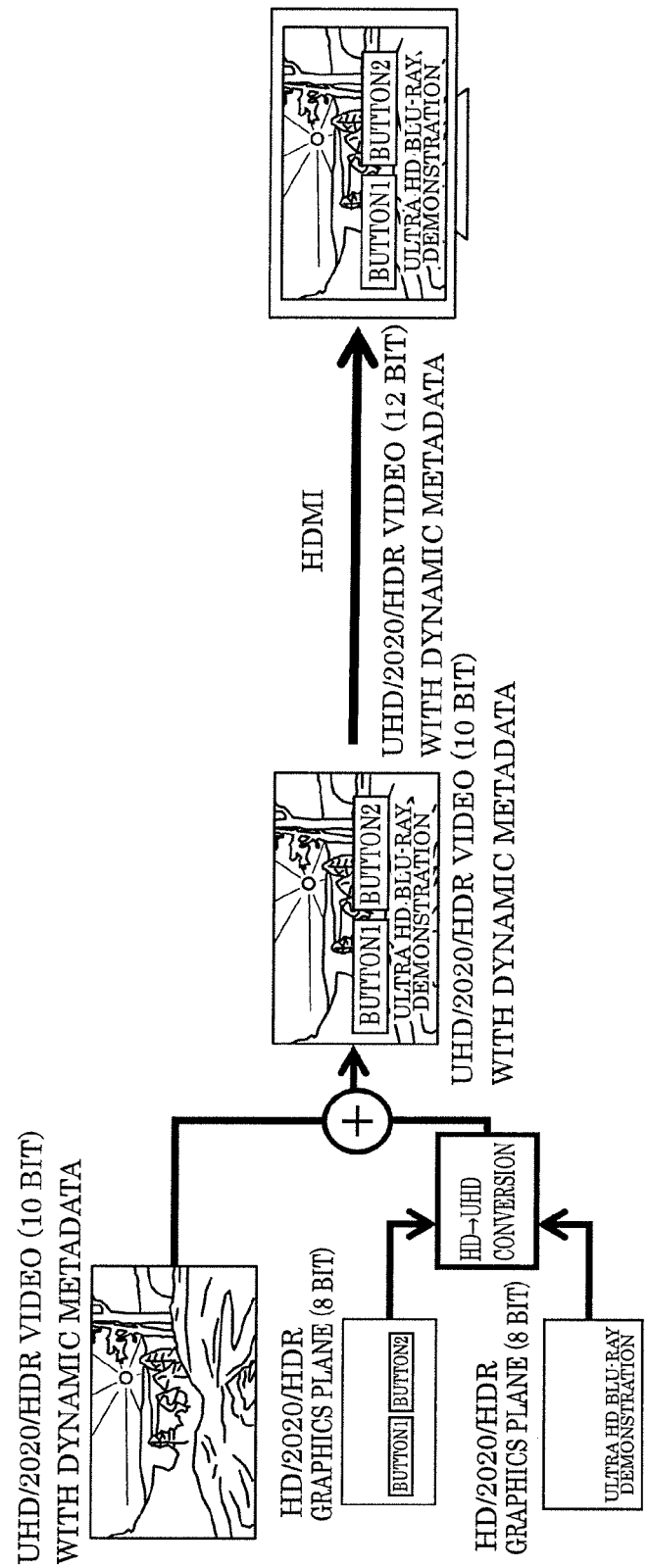
FIG. 5 is a diagram showing an example in which graphics are overlaid on a moving image, and the resulting moving image is displayed.

FIG. 5 is a diagram showing an example in which graphics such as a menu and subtitles are overlaid on a moving image, and the moving image is displayed on a video display apparatus. Here, an example of Ultra HD Blu-ray is shown.

A set of moving images before graphics are overlaid will be referred to as a main video. With Ultra HD Blu-ray, graphics are prepared in HD resolution. A video reproduction apparatus performs HD-UHD conversion on the graphics in HD resolution so as to generate graphics in UHD resolution. Then, the video reproduction apparatus overlays the obtained graphics in UHD resolution on the main video having UHD resolution. Then, the video reproduction apparatus transmits the video resulting from the overlay process to a video display apparatus via HDMI® (High-Definition Multimedia Interface). The video display apparatus displays the transmitted video in HDR.

Also, the video reproduction apparatus determines dynamic metadata based on the variation of the luminance of the main video with time, and transmits the dynamic metadata to the video display apparatus via HDMI. The video display apparatus performs dynamic tone mapping on a video signal of the video obtained by overlaying subtitles and menus on the main video based on the transmitted dynamic metadata.

The same applies to an HDR video that is displayed through an OTT (over the top) service via broadcasting or communication and in which a menu or subtitles are overlaid on a main video, and the resulting video is displayed on a video display apparatus.

[1-6. Problem Arising when Performing Dynamic Tone Mapping on Video Data where Graphics are Overlaid on Moving Image]

In the dynamic metadata method, metadata regarding the luminance of the HDR video such as luminance distribution is designated for each frame, and the metadata is transmitted to the video display apparatus together with the video signal. The video display apparatus performs processing such as luminance conversion based on the transmitted metadata according to the display capabilities of the video display apparatus such as maximum luminance. The dynamic metadata method as described above is receiving increased attention as a method for displaying a video at a constant quality as much as possible irrespective of the display performance of a video display apparatus such as luminance.

However, dynamic metadata varies with time, and thus there is a problem in that a video that needs to be displayed stably is not displayed stably.

If the video to be displayed is a video or a set of so-called moving images that is simultaneously edited or supervised, processing can be performed considering the state of the video to some degree. When graphics data such as subtitles or a menu whose luminance is essentially constant and does not vary at all is overlaid on a main video composed of a set of moving images as described above and displayed, due to the processing that uses dynamic metadata, a negative effect occurs such as variation of the luminance or color of the graphics that essentially needs to be constant. This negative effect becomes more prominent as the luminance of the main video is higher and the luminance of the video display apparatus is lower.

Figure 6:
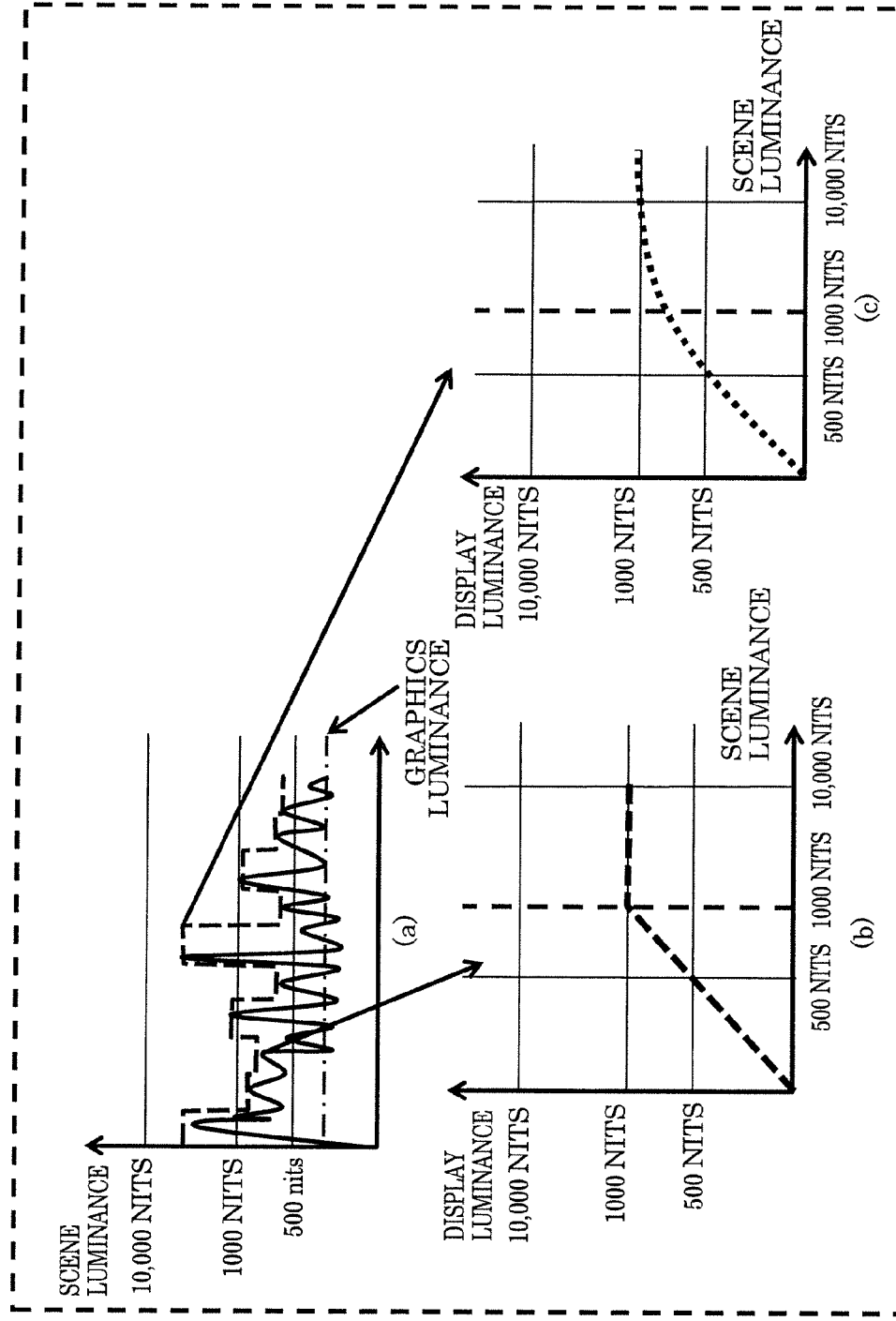
FIG. 6 is a diagram showing the influence of dynamic tone mapping when graphics are overlaid on a main video.

FIG. 6 is a diagram showing the influence of dynamic tone mapping when graphics are overlaid on a main video. It is assumed here that, as shown in (a) in FIG. 6, graphics to be overlaid has a luminance of 350 nits. As shown in (b) in FIG. 6, in a section in which the luminance of the main video is low, tone mapping is not performed, and thus the graphics are displayed on a video display apparatus at a luminance of 350 nits that is the original luminance of the graphics. On the other hand, as shown in (c) in FIG. 6, in a section in which the luminance of the main video is high, tone mapping is performed, and thus the graphics are displayed on the video display apparatus at a luminance lower than 350 nits. In this way, the graphics luminance that essentially needs to be constant varies with time, resulting in an undesired state. In this example, only the influence on the luminance is considered, but in an actual video display apparatus, the influence may also be exerted on color components, and thus colors may also be affected.

[1-7. Solution]

As a means for avoiding the problem described above, a method may be conceived in which the position information of graphics to be overlaid is transmitted to the video display apparatus, and dynamic metadata is not used in an area where the graphics are displayed. However, it is very difficult to implement this method because it is necessary to transmit information that indicates whether graphics are displayed in the entire region of the display screen, and also necessary to make determinations for each display pixel in the processing performed by the video display apparatus.

In the present disclosure, the following solution is used. According to a first method, the video reproduction apparatus transmits a "graphics overlay flag" that indicates whether or not graphics are overlaid on the main video to the video display apparatus as dynamic metadata information. Graphics include a menu and subtitles, and thus the video reproduction apparatus may transmit a "menu overlay flag" and a "subtitles overlay flag" to the video display apparatus as the "graphics overlay flag".

The video display apparatus switches dynamic tone mapping between on and off or changes the intensity of dynamic tone mapping according to the state of the menu overlay flag. With this configuration, the influence of dynamic tone mapping on the overlaid graphics can be reduced.

According to a second method, in addition to the first method, the video reproduction apparatus transmits graphics maximum luminance information regarding the graphic maximum luminance of the graphics to be overlaid as the dynamic metadata information to the video display apparatus. As with the overlay flag, the graphics maximum luminance information may include subtitles maximum luminance information and menu maximum luminance information.

The video display apparatus can more finely control dynamic tone mapping according to the graphics overlay flag and the graphics maximum luminance information.

According to a third method, the video display apparatus detects graphics to be displayed constantly by using inter-frame correlation or the like, and does not perform dynamic tone mapping on the detected portion.

According to a fourth method, an HDR video reproduction apparatus such as an Ultra HD Blu-ray reproduction apparatus, a broadcast reception apparatus, or an internet broadcast reception apparatus changes the luminance of graphics to be overlaid according to the maximum luminance information of a video display apparatus to which the HDR video reproduction apparatus is connected, so as to reduce the influence of tone mapping performed by the video display apparatus. The video reproduction apparatus may acquire the maximum luminance of the video display apparatus from settings set by an operator, or may acquire the same from the video display apparatus based on EDID stored in HDMI connected to the video reproduction apparatus.

There are various methods for tone mapping performed in a video display apparatus, and thus the graphics luminance can be adjusted within a predetermined range. As the method for adjusting the graphics luminance, it is possible to use a method in which an operator sets the graphics luminance, a method in which the graphics luminance is adjusted based on information acquired from the database of each video display apparatus, or the like.

According to a fifth method, the HDR video reproduction apparatus assumes a dynamic tone mapping method performed by a video display apparatus that displays an HDR video on which graphics are overlaid, and performs inverse conversion of the dynamic tone mapping performed by the video display apparatus on the graphics to be overlaid before the graphics are overlaid. As a result, the overlaid graphics can be displayed with the original luminance and color after the dynamic tone mapping has been performed.

The video reproduction apparatus may use the following method as the method for assuming the dynamic tone mapping method performed by the video display apparatus to which the video reproduction apparatus is connected. The video reproduction apparatus may assume the dynamic tone mapping method simply based on video luminance information corresponding to, for example, 90% of the maximum luminance of the video display apparatus as the maximum luminance that is free from influence. To be more specific, the video reproduction apparatus may acquire the method from a database. Alternatively, the video reproduction apparatus may perform measurement by using a test pattern, and set the method based on the result of measurement.

With the methods described above, the influence of dynamic tone mapping on graphics such as a menu or subtitles can be reduced when dynamic tone mapping is performed on an HDR video signal transmitted via broadcasting, a packaged medium such as a Blu-ray disc, or internet delivery such as OTT. As a result, it is possible to display subtitles or a menu in a stable manner, and obtain advantageous effects of dynamic tone mapping according to the maximum luminance (DPL) of the video display apparatus and the maximum luminance of the moving images.

Also, in particular, in the case where the luminance of the video display apparatus is lower than the luminance of a video, HDR effects can be increased, and a menu and subtitles can be displayed with high quality as high as that of static tone mapping.

Also, different processing operations are performed on subtitles and a menu, and thus the influence of dynamic tone mapping can be further reduced as a result of performing different processing operations suitable for subtitles and a menu. Specifically, the luminance of a menu varies while the luminance of subtitles is substantially constant. Also, when subtitles are displayed while the main video is reproduced, the subtitles are displayed in synchronization with the main video from the beginning to the end of the main video. On the other hand, a menu is displayed only when an operation is performed, and thus it does not synchronize the main video. In this way, processing can be performed in consideration of the difference in the properties of subtitles and menus.

2. Embodiment 1

In the present embodiment, the video reproduction apparatus embeds the graphics overlay flag, which indicates whether graphics are overlaid on the main video, into a portion of the dynamic metadata, and transmits the dynamic metadata to the video display apparatus. The video display apparatus switches dynamic tone mapping that uses the dynamic metadata between on and off or changes the intensity of dynamic tone mapping according to the state of the graphics overlay flag. With this configuration, the influence of dynamic tone mapping on the overlaid graphics can be reduced. The graphics overlay flag may be composed of two flags: a subtitles overlay flag that indicates whether or not there are subtitles to be displayed; and a menu overlay flag that indicates whether or not there is a menu to be displayed.

[2-1. Configuration of Video Display System]

Figure 7:
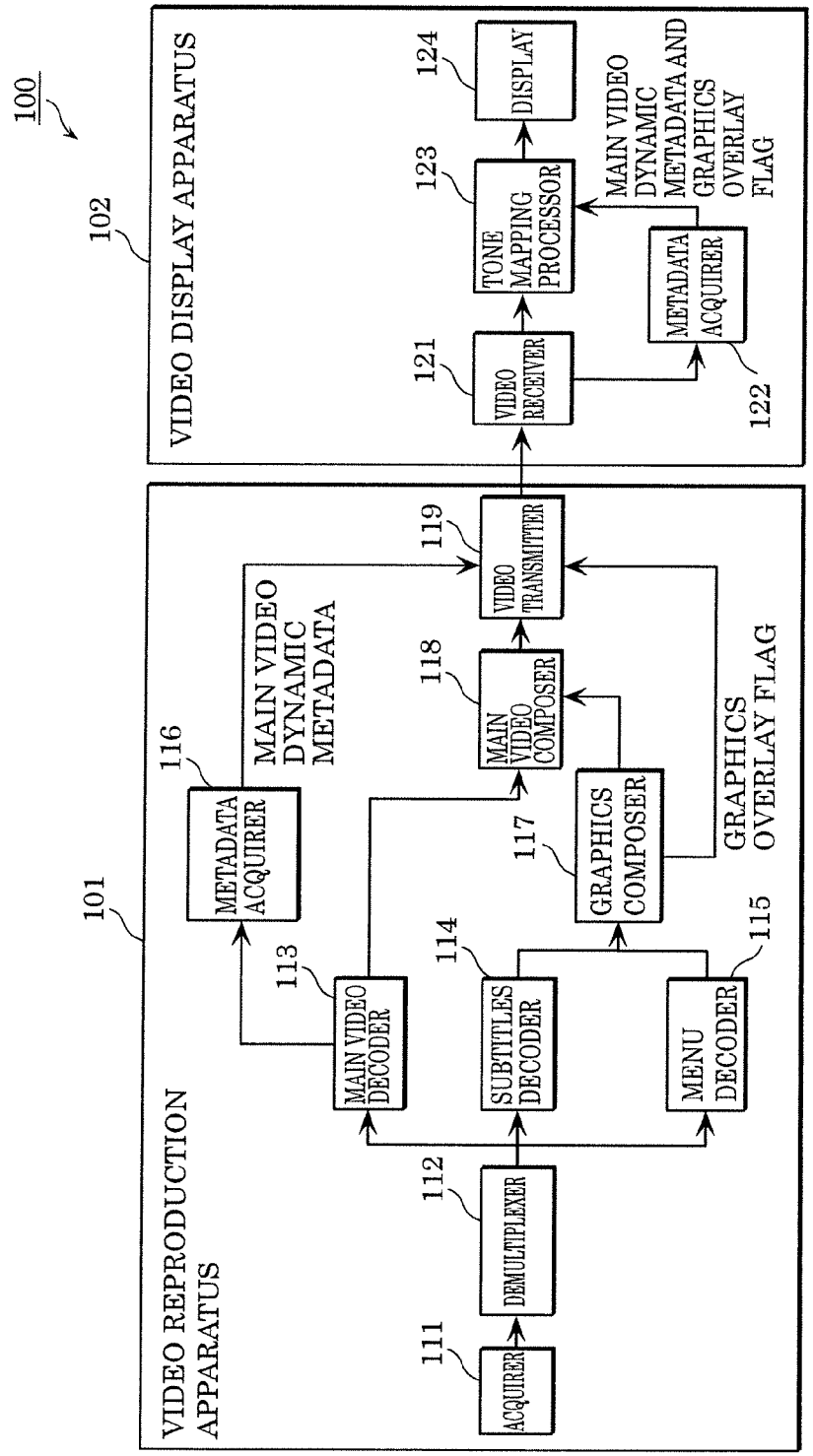
FIG. 7 is a block diagram of a video display system according to Embodiment 1.

FIG. 7 is a block diagram showing a configuration of video display system 100 according to the present embodiment. Video display system 100 shown in FIG. 7 includes video reproduction apparatus 101 and video display apparatus 102.

Video reproduction apparatus 101 reproduces a video, and outputs the obtained video to video display apparatus 102. Video reproduction apparatus 101 includes acquirer 111, demultiplexer 112, main video decoder 113, subtitles decoder 114, menu decoder 115, metadata acquirer 116, graphics composer 117, main video composer 118, and video transmitter 119.

Acquirer 111 acquires a video signal. For example, in the case where video reproduction apparatus 101 is a disc reproduction apparatus, acquirer 111 acquires a video signal by reproducing a disc. In the case where video reproduction apparatus 101 is a broadcast reception apparatus, acquirer 111 acquires a video signal by receiving a broadcast wave. In the case where video reproduction apparatus 101 is an internet broadcast reception apparatus, acquirer 111 acquires a video signal by receiving an internet broadcast.

Demultiplexer 112 outputs a main video signal, a subtitles signal, and a menu signal that have been encoded and included in the video signal to main video decoder 113, subtitles decoder 114, and menu decoder 115, respectively.

Main video decoder 113 decodes the encoded main video signal output from demultiplexer 112.

Subtitles decoder 114 decodes the encoded subtitles signal output from demultiplexer 112. Also, subtitles decoder 114 determines whether or not to display subtitles based on a user's operation or the like, and selects the type of subtitles to be displayed. Subtitles decoder 114 outputs the selected subtitles to graphics composer 117 when displaying the subtitles.

Menu decoder 115 decodes the encoded menu signal output from demultiplexer 112. Also, menu decoder 115 determines whether or not to display a menu based on a user's operation or the like, and selects the type of menu to be displayed. Menu decoder 115 outputs the selected menu to graphics composer 117 when displaying the menu. Menu decoder 115 may overlay and display a menu by using, not only information from the video signal, but also a program that runs on video reproduction apparatus 101.

Metadata acquirer 116 acquires main video dynamic metadata. For example, metadata acquirer 116 generates main video dynamic data based on information included in the main video signal.

Graphics composer 117 generates graphics information by configuring subtitles and a menu. As described above, graphics composer 117 may convert the resolutions of the subtitles and the menu. For example, in the case of Ultra HD Blu-ray, graphics composer 117 converts the subtitles and the menu in HD format to UHD format.

Also, in the case where graphics composer 117 generates graphics information and overlays the generated graphics information on the main video, graphics composer 117 sets the graphics overlay flag to ON, and transmits the graphics overlay flag to video transmitter 119. In the case where graphics composer 117 does not overlay the graphics information on the main video, graphics composer 117 sets the graphics overlay flag to OFF, and transmits the graphics overlay flag to video transmitter 119. The graphics overlay flag may be generated by a program in video reproduction apparatus 101, or by any other means.

Main video composer 118 generates a video signal by overlaying the graphics information generated by graphics composer 117 on the main video obtained by main video decoder 113.

Video transmitter 119 transmits the video signal generated by main video composer 118 and the dynamic metadata to video display apparatus 102 via a video signal transmitting means such as an HDMI cable. The dynamic metadata includes the main video dynamic metadata acquired by metadata acquirer 116 and the graphics overlay flag generated by graphics composer 117.

FIG. 8A is a diagram showing a configuration example of the main video dynamic metadata and the graphics overlay flag transmitted from video reproduction apparatus 101 to video display apparatus 102. As shown in FIG. 8A, the main video dynamic metadata shows the maximum luminance and the average luminance of the main video. For example, the main video dynamic metadata shows the maximum luminance and the average luminance per frame or more frames.

FIG. 8B is a diagram showing another configuration example of the main video dynamic metadata and the graphics overlay flag. As shown in FIG. 8B, the graphics overlay flag may include a subtitles overlay flag that indicates whether subtitles are overlaid on the main video and a menu overlay flag that indicates whether a menu is overlaid on the main video.

Next, a configuration of video display apparatus 102 will be described. Video display apparatus 102 includes video receiver 121, metadata acquirer 122, tone mapping processor 123, and display 124.

Video receiver 121 receives the video signal and the dynamic metadata transmitted from video reproduction apparatus 101. Video receiver 121 separates the video signal from the dynamic metadata, and transmits the video signal to tone mapping processor 123 and the dynamic metadata to metadata acquirer 122. Metadata acquirer 122 transmits the main video dynamic metadata and the graphics overlay flag included in the dynamic metadata to tone mapping processor 123 as a control signal.

Tone mapping processor 123 performs a tone mapping process on the video signal in accordance with the main video dynamic metadata. Specifically, tone mapping processor 123 performs a tone mapping process (dynamic tone mapping process) on the video signal in accordance with the main video dynamic metadata in the case where the graphics overlay flag is set to OFF. On the other hand, in the case where the graphics overlay flag is set to ON, tone mapping processor 123 performs a tone mapping process with reduced influence of dynamic tone mapping on the overlaid graphics. Display 124 displays the video signal that has undergone the tone mapping process.

[2-2. Tone Mapping Processor]

Figure 9:
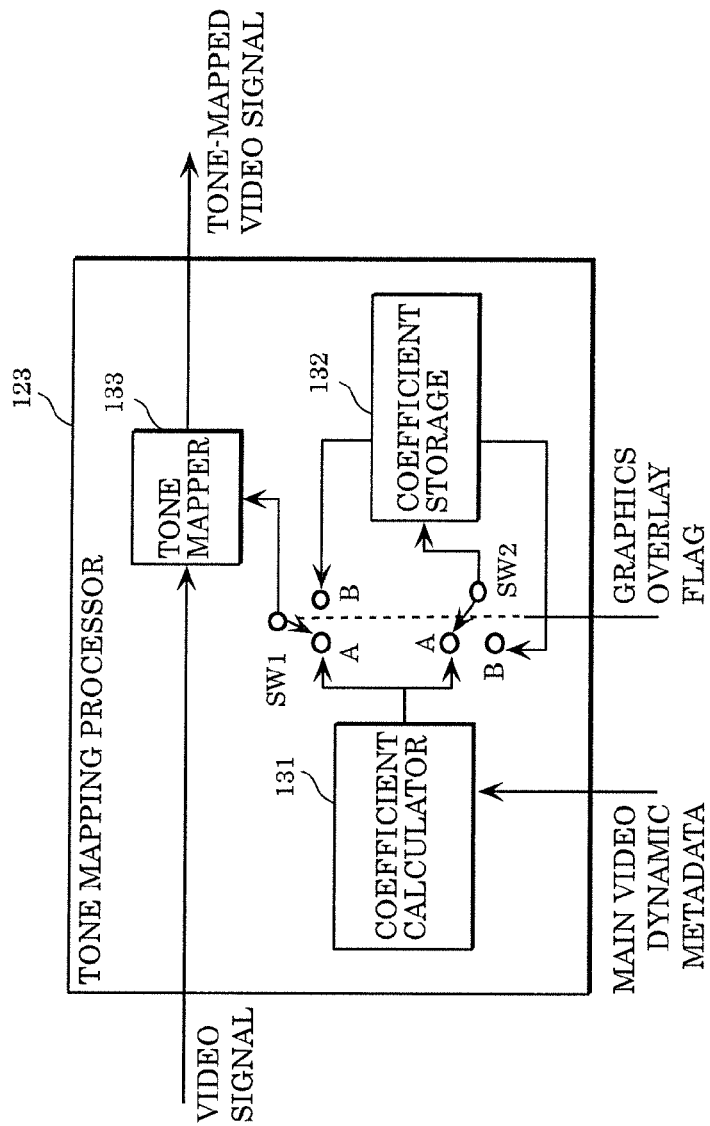
FIG. 9 is a block diagram of a tone mapping processor according to Embodiment 1.

Tone mapping processor 123 will be described in detail. FIG. 9 is a block diagram showing a configuration of tone mapping processor 123. Tone mapping processor 123 includes coefficient calculator 131, coefficient storage 132, tone mapper 133, and switches SW1 and SW2.

The video signal from video receiver 121 is transmitted to tone mapper 133. The main video dynamic metadata from metadata acquirer 122 is transmitted to coefficient calculator 131.

Coefficient calculator 131 calculates a tone mapping coefficient used in the tone mapping process performed by tone mapper 133 according to the video display capabilities such as the luminance of video display apparatus 102. Coefficient storage 132 stores the tone mapping coefficient calculated by coefficient calculator 131. As used herein, the tone mapping coefficient refers to a coefficient included in a function that indicates conversion characteristics used in the tone mapping process. That is, the conversion characteristics are determined based on the tone mapping coefficient.

Switch SW1 selects one from the tone mapping coefficient (A) calculated by coefficient calculator 131 and the tone mapping coefficient (B) stored in coefficient storage 132, and transmits the selected tone mapping coefficient to tone mapper 133. Switch SW2 selects one from the tone mapping coefficient (A) calculated by coefficient calculator 131 and the tone mapping coefficient (B) stored in coefficient storage 132, and inputs the selected tone mapping coefficient to coefficient storage 132. That is, switch SW2 switches between (A) updating the tone mapping coefficient stored in coefficient storage 132 with the tone mapping coefficient newly calculated by coefficient calculator 131 and (B) continuously storing the currently stored tone mapping coefficient.

Switches SW1 and SW2 work in conjunction with each other. In the case where the graphics overlay flag is set to OFF, switches SW1 and SW2 are both connected to A. In the case where the graphics overlay flag is set to ON, switches SW1 and SW2 are both connected to B. With this configuration, dynamic tone mapping based on the dynamic metadata is fixed in the case where graphics are overlaid.

Also, in the case where the graphics overlay flag includes a subtitles overlay flag and a menu overlay flag, the processing of the tone mapping coefficient input to tone mapper 133 may be changed according to the combination. As an example, in the case where the graphics overlay flag is set to ON, the tone mapping coefficient is fixed (switches SW1 and SW2 are connected to B). When only the menu overlay flag is set to ON, a normal tone mapping coefficient is used (switches SW1 and SW2 are connected to A).

The configuration described here is merely an example, and thus tone mapping processor 123 may be configured to, in the case where the graphics overlay flag is set to ON, fix the tone mapping coefficient at a specific luminance or less, or not perform a tone mapping process.

FIG. 10 is a diagram showing a configuration of tone mapping processor 123A that is configured to fix the tone mapping coefficient at a specific luminance or less. Tone mapping processor 123A includes coefficient composer 134 in place of switch SW1.

In the case where the graphics overlay flag is set to ON, coefficient composer 134 performs a dynamic tone mapping process on a luminance greater than or equal to a border luminance level that is a predetermined luminance. However, coefficient composer 134 performs the following processing on a luminance less than the border luminance: (1) fixing the tone mapping; (2) not performing a tone mapping process; (3) suppressing variation of tone mapping; or (4) making the influence of tone mapping imperceptible to human. As used herein, the border luminance level refers to, for example, a luminance higher than the maximum luminance value used in the graphics. With this configuration, the variation of tone mapping in the luminance range used in the graphics is suppressed. Also, in the processing described above, in order to maintain continuity between the conversion characteristics greater than or equal to the border luminance level and the conversion characteristics less than the border luminance level, coefficient composer 134 may correct the conversion characteristics in these border regions such that the conversion characteristics varies smoothly.

Here, the configuration has been described using only a video, subtitles, and a menu, but video reproduction apparatus 101 and video display apparatus 102 are configured to also process, transmit, and output an audio signal and the like. These are irrelevant to the present disclosure, and thus a description thereof is omitted here and in the following description.

Also, in the case where the graphics overlay flag includes a subtitles overlay flag and a menu overlay flag, coefficient composer 134 shown in FIG. 10 uses different overlay methods depending on the state of the subtitles overlay flag and the menu overlay flag. For example, coefficient composer 134 sets the border luminance level to different values between when the graphics overlay flag is set to ON and when only the menu overlay flag is set to ON.

Coefficient composer 134 sets the border luminance level by taking into consideration the highest luminance of display 124 and other video-related characteristics. In general, the luminance level of a menu is higher than the luminance level of subtitles. Accordingly, in the case where the menu overlay flag is set to ON, coefficient composer 134 sets the border luminance level to be higher than that in the case where only the subtitles overlay flag is set to ON.

Whether to overlay a menu is determined by a user, and thus importance may be placed on tone mapping of the main video rather than the influence of dynamic tone mapping on the menu. Accordingly, in the case where the menu overlay flag is set to ON, coefficient composer 134 may set the border luminance level to be lower than that in the case where the graphics overlay flag is set to ON.

[2-3. Operations of Video Display System]

Figure 11A:
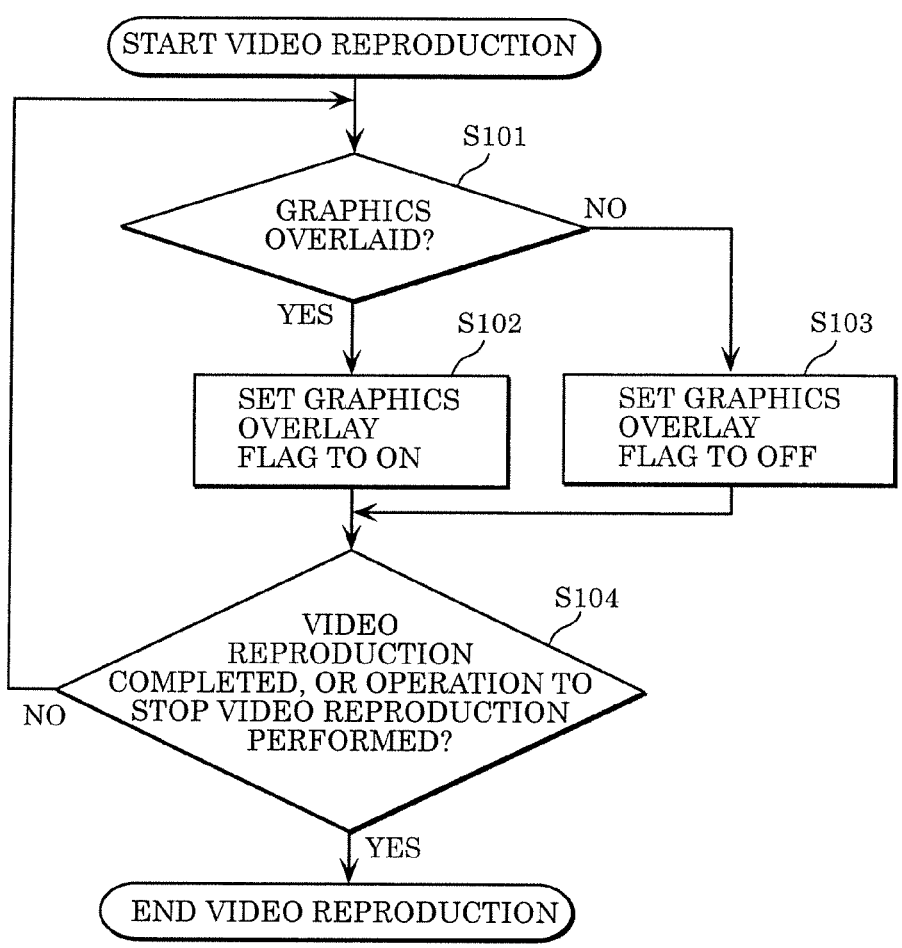
FIG. 11A is a flowchart illustrating the processing of a video reproduction apparatus according to Embodiment 1.

A flow of operations performed in the video display system will be described. FIG. 11A is a flowchart illustrating the operations of video reproduction apparatus 101. After the reproduction of a video starts, video reproduction apparatus 101 determines, based on the graphics (subtitles and a menu) processing state, whether graphics are overlaid on the main video (S101). If it is determined that graphics are overlaid on the main video (Yes in S101), video reproduction apparatus 101 sets the graphics overlay flag to ON (S102). If, on the other hand, it is determined that graphics are not overlaid on the main video (No in S101), video reproduction apparatus 101 sets the graphics overlay flag to OFF (S103). Then, video reproduction apparatus 101 repeatedly performs the processing operations of steps S101 to S103 until the reproduction of the video is completed or an operation to stop the reproduction of the video is performed (S104). For example, the processing operations are repeatedly performed for each frame or every plurality of frames.

Figure 11B:
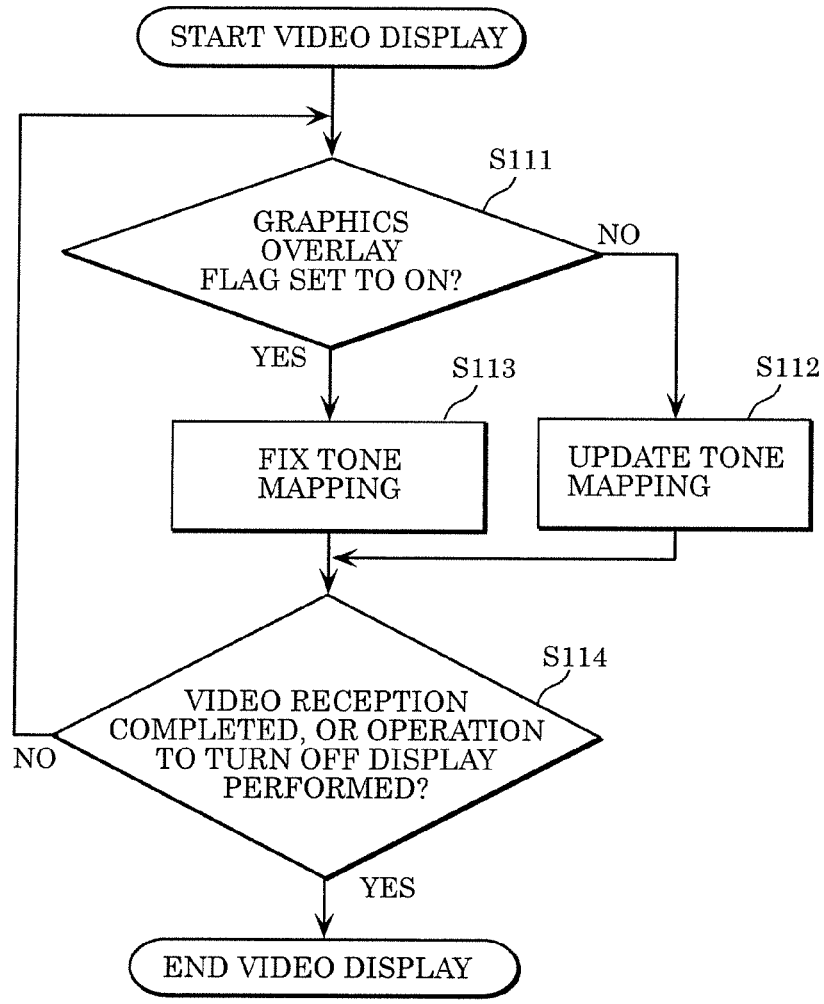
FIG. 11B is a flowchart illustrating the processing of a video display apparatus according to Embodiment 1.

FIG. 11B is a flowchart illustrating the operations of video display apparatus 102. Video display apparatus 102 starts a tone mapping process at the same time as it starts displaying the video. At this time, video display apparatus 102 determines whether the graphics overlay flag is set to ON or OFF (S111). If it is determined that the graphics overlay flag is set to OFF (No in S111), video display apparatus 102 connects switches SW1 and SW2 to A so as to perform a tone mapping process based on the main video dynamic metadata and update the tone mapping (S112). That is, coefficient calculator 131 calculates the tone mapping coefficient based on the main video dynamic metadata at the current time, and tone mapper 133 performs a tone mapping process on the video at the current time by using the calculated tone mapping coefficient. At this time, coefficient storage 132 stores the newly calculated tone mapping coefficient.

When the graphics overlay flag is set to ON (Yes in S111), video display apparatus 102 connects switches SW1 and SW2 to B so as to fix the tone mapping (S113). Specifically, as a result of the input terminal of coefficient storage 132 being connected to the output terminal of coefficient storage 132, coefficient storage 132 stores the tone mapping coefficient immediately before switch SW2 is switched from A to B. Also, switch SW1 is connected to B, and thus the tone mapping coefficient used by tone mapper 133 is fixed. Accordingly, the variation of tone mapping with time is eliminated.

Also, when the graphics overlay flag is set to OFF (No in S111), the variation of the tone mapping coefficient with time starts (S112). The processing operations in steps S111 to S113 are repeatedly performed until the reception of the video is completed or an operation to turn off the display is performed (S114). For example, the processing operations are repeatedly performed for each frame or every plurality of frames.

As described above, video display system 100 according to the present embodiment includes tone mapping processor 123 that performs a tone mapping process of converting the luminance of a video by using conversion characteristics according to the maximum luminance of the video and display 124 that displays the video that has undergone the tone mapping process. Tone mapping processor 123 switches between the first tone mapping process of dynamically changing the conversion characteristics according to the time-dependent change in the maximum luminance of the video (S112) and the second tone mapping process that is performed using constant conversion characteristics irrespective of the time-dependent change in the maximum luminance of the video (S113).

With this configuration, the processing can be switched according to, for example, the type of video or the like between dynamically changing the conversion characteristics for use in tone mapping and fixing the same. Accordingly, by either performing optimal tone mapping at each point in time or fixing tone mapping according to the type of video or the like, switching can be performed between suppressing and not suppressing the variation in the luminance of the video that essentially needs to be constant. In this way, video display system 100 can improve the quality of a video displayed.

Also, video display system 100 further includes a composer (main video composer 118 and graphics composer 117) that overlays graphics on the main video to generate the final output video. If graphics are not overlaid on the main video (No in S111), tone mapping processor 123 performs the first tone mapping process (S112). If graphics are overlaid on the main video (Yes in S111), tone mapping processor 123 performs the second tone mapping process (S113). With this configuration, the variation in the luminance of the graphics can be suppressed.

Also, the composer generates a first flag (graphics overlay flag) that indicates whether or not graphics are overlaid on the main video. Tone mapping processor 123 determines, according to the first flag, which of the first tone mapping process and the second tone mapping process is to be performed.

Also, graphics include subtitles and a menu, and the first flag includes a second flag (subtitles overlay flag) that indicates whether or not subtitles are overlaid on the main video and a third flag (menu overlay flag) that indicates whether or not a menu is overlaid on the main video. With this configuration, it is possible to perform a tone mapping process suitable for each of the cases where subtitles are overlaid and where a menu is overlaid.

For example, when switching from the first tone mapping process to the second tone mapping process, tone mapping processor 123 continuously uses the conversion characteristics used immediately before the switching in the second tone mapping process. With this configuration, it is possible to suppress a significant variation in the luminance when switching is performed from the first tone mapping process to the second tone mapping process.

For example, as shown in FIG. 10, in the second tone mapping process, with respect to a luminance greater than or equal to the border luminance level, tone mapping processor 123A dynamically changes the conversion characteristics according to the time-dependent change in the maximum luminance of the video. With respect to a luminance less than the border luminance level, tone mapping processor 123A uses constant conversion characteristics irrespective of the time-dependent change in the maximum luminance of the video.

With this configuration, with respect to a luminance greater than or equal to the border luminance level, optimal tone mapping can be performed at each point in time, and at the same time, with respect to a luminance less than the border luminance level, it is possible to suppress the luminance variation.

Also, video display apparatus 102 according to the present embodiment includes tone mapping processor 123 that performs a tone mapping process of converting the luminance of a video by using conversion characteristics according to the maximum luminance of the video and display 124 that displays the video that has undergone the tone mapping process. Tone mapping processor 123 switches between the first tone mapping process of dynamically changing the conversion characteristics according to the time-dependent change in the maximum luminance of the video (S112) and the second tone mapping process that is performed using constant conversion characteristics irrespective of the time-dependent change in the maximum luminance of the video (S113).

With this configuration, the processing can be switched according to, for example, the type of video or the like between dynamically changing the conversion characteristics for use in tone mapping and fixing the same. Accordingly, by either performing optimal tone mapping at each point in time or fixing tone mapping according to the type of video or the like, switching can be performed between suppressing and not suppressing the variation in the luminance of the video that essentially needs to be constant. In this way, video display apparatus 102 can improve the quality of a video displayed.

If it is determined that the video does not contain graphics (No in S111), tone mapping processor 123 performs the first tone mapping process (S112). If it is determined that the video contains graphics (Yes in S111), tone mapping processor 123 performs the second tone mapping process (S113). With this configuration, it is possible to suppress the variation in the luminance of the graphics.

Also, tone mapping processor 123 determines which of the first tone mapping process and the second tone mapping process is to be performed according to the first flag (graphics overlay flag) that indicates which of the first tone mapping process and the second tone mapping process is to be performed.

Also, the first flag includes a second flag (subtitles overlay flag) that indicates whether or not the video contains subtitles and a third flag (menu overlay flag) that indicates whether the video contains a menu. With this configuration, it is possible to perform a tone mapping process suitable for each of the cases where subtitles are overlaid and where a menu is overlaid.

3. Embodiment 2

In the present embodiment, in addition to the processing of Embodiment 1, video reproduction apparatus 101 embeds graphics luminance information of the graphics to be overlaid on the main video into a portion of the dynamic metadata. Video display apparatus 102 switches dynamic tone mapping between on and off or changes the intensity of dynamic tone mapping according to the state of the menu overlay flag and the graphics luminance information. With this configuration, the influence of dynamic tone mapping on the overlaid graphics can be reduced.

[3-1. Configuration]

Video reproduction apparatus 101 according to the present embodiment is different from that of Embodiment 1 in terms of the following points. In the case where graphics information is overlaid on the main video, graphics composer 117 shown in FIG. 7 sets the graphics overlay flag to ON, extracts graphics luminance information that is information regarding the luminance of the graphics, and then transmits the extracted graphics luminance information to video transmitter 119. Video transmitter 119 transmits the graphics luminance information to video display apparatus 102 as a portion of the dynamic metadata. Graphics composer 117 may use a pre-set fixed value as the graphics luminance information, or extract luminance information from the graphics information as needed, or acquire the graphics luminance information by referring to metadata provided by other means.

Also, the graphics luminance information may include subtitles luminance information and menu luminance information.

Video display apparatus 102 according to the present embodiment is different from that of Embodiment 1 in terms of the following points. Metadata acquirer 122 shown in FIG. 7 acquires the graphics luminance information in addition to the main video dynamic metadata and the graphics overlay flag, and transmits these information to tone mapping processor 123. Specifically, tone mapping processor 123 has, for example, the configuration shown in FIG. 10, and includes coefficient composer 134. In addition to the graphics overlay flag, the graphics luminance information is input to coefficient composer 134, and coefficient composer 134 performs processing of composing the tone mapping coefficient by using the graphics luminance information. For example, coefficient composer 134 does not change tone mapping with time with respect to a luminance less than or equal to the graphics luminance information. That is, coefficient composer 134 uses the graphics luminance information as the border luminance of Embodiment 1.

Also, in Embodiments 1 and 2, coefficient composer 134 may adjust the border luminance level based on the settings of video display apparatus 102, or the like. Likewise, video reproduction apparatus 101 may, instead of transmitting the graphics luminance information directly to video display apparatus 102, adjust the graphics luminance information based on the environment, the type of video reproduced, users' preference or the like, and then transmit the graphics luminance information to video display apparatus 102. By doing so, it is possible to adjust the degree of influence of dynamic tone mapping on the graphics and the degree of adaptation to the main video.

The graphics luminance information may include subtitles luminance information and menu luminance information. In this case, as in Embodiment 1, coefficient composer 134 may change the method of composing dynamic tone mapping depending on the subtitles or the menu.

FIG. 12A is a diagram showing a configuration example of the main video dynamic metadata, the graphics overlay flag, and the graphics luminance information transmitted from video reproduction apparatus 101 to video display apparatus 102 in the present embodiment. The graphics luminance information shows the maximum luminance of the graphics used. For example, the main video dynamic metadata shows the maximum luminance and the average luminance per frame or more frames.

FIG. 12B is a diagram showing another configuration example of the main video dynamic metadata, the graphics overlay flag, and the graphics luminance information. As shown in FIG. 12B, the graphics luminance information may include maximum subtitles luminance and maximum menu luminance.

Also, the graphics luminance information may include the application of the graphics overlay flag. For example, a portion or a specific value of the graphics luminance information may indicate that the graphics overlay flag is set to OFF, and other values may indicate that the graphics overlay flag is set to ON.

FIG. 13A is a diagram showing a configuration example of the main video dynamic metadata and the graphics luminance information transmitted from video reproduction apparatus 101 to video display apparatus 102 in this case. In the example shown in FIG. 13A, the graphics luminance information is 8 bit, and indicates a luminance of 0 to 1020 nits. A value of 0 indicates that graphics are present, but the luminance is not known. A value of 1 indicates that graphics are not present, and other values indicate brightness levels of 8 nits to 1020 nits, with an increment of 4 nits. The bit configuration of the graphics luminance information, the brightness range, and the definitions of the value of 0, the value of 1 and other values are not limited thereto, and can be changed according to the system requirements.

Also, as shown in FIG. 13B, the same applies to the case where the graphics luminance information includes subtitles luminance information and menu luminance information.

[3-2. Advantageous Effects]

Figure 14A:
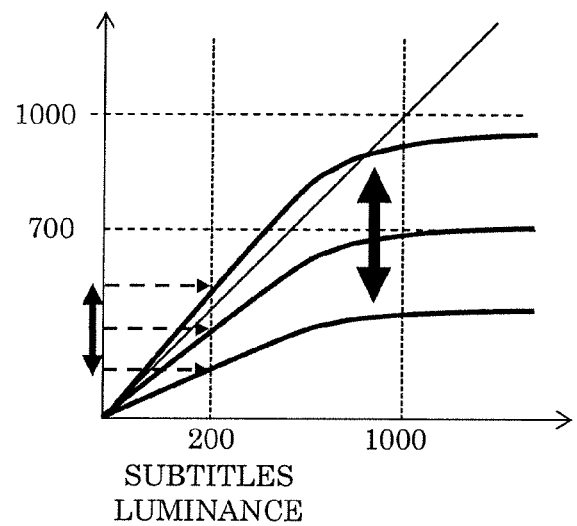
FIG. 14A is a diagram showing a luminance variation in conventional tone mapping.

FIG. 14A is a diagram showing a variation in the luminance of subtitles in conventional dynamic tone mapping in the case where graphics are subtitles. In the case of the subtitles luminance level being 200 nits or less, when the tone mapping varies with time, as can be seen from FIG. 14A, the luminance at a level from 0 to near 200 nits also varies, and the subtitles luminance that essentially needs to be constant varies.

In contrast, in Embodiment 2, the occurrence of variation in tone mapping with time can be prevented with respect to a luminance less than or equal to a predetermined border luminance. Accordingly, as can be seen from FIG. 14B, there is no variation with time below a level of 200 nits, which is the subtitles luminance, and thus the subtitles are displayed at a stable luminance level. Here, the border luminance is, for example, a fixed value that is higher than the luminance level of ordinary subtitles, and the knee point of the conversion characteristics is also fixed.

However, when the border luminance level is fixed, a problem arises in that the range of variation of dynamic tone mapping is limited, and advantageous effects of dynamic tone mapping on the main video are reduced. The problem becomes prominent particularly when the maximum luminance (DPL) of video display apparatus 102 is low. It is of course possible to enhance the advantageous effects of dynamic tone mapping by devising the dynamic tone mapping method such as expecting the luminance of graphics data to a predetermined value or less in video display apparatus 102. However, in this case, there is a problem in that, when graphics data having a luminance higher than expected is displayed, the display of the graphics data is susceptible to the influence of dynamic tone mapping.

Figure 14B:
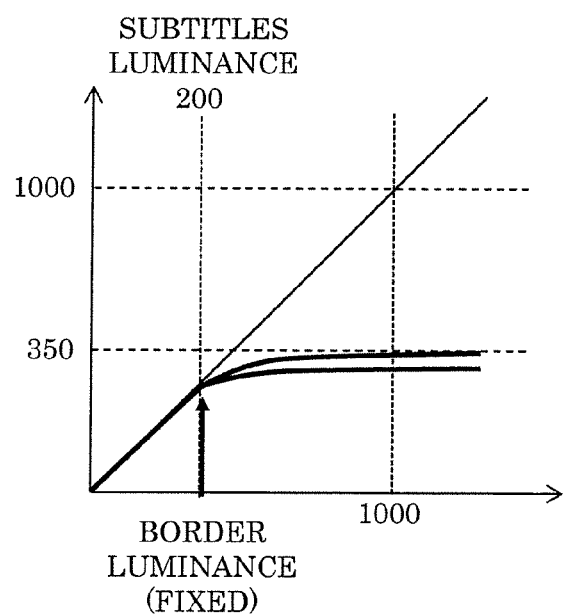
FIG. 14B is a diagram showing a luminance variation in tone mapping according to Embodiment 1.
Figure 15:
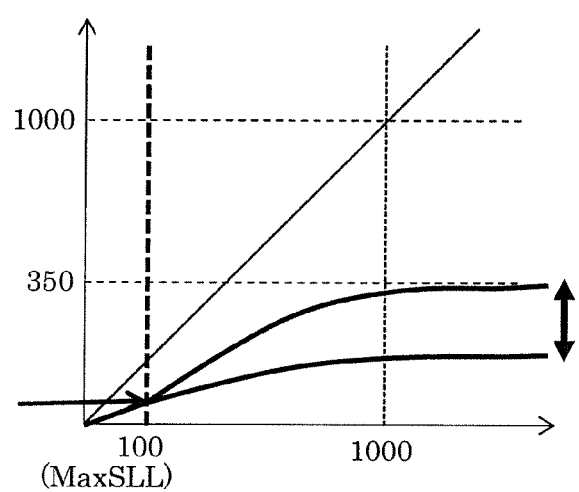
FIG. 15 is a diagram showing a luminance variation in tone mapping according to Embodiment 2.

To address this, Embodiment 2 is configured such that the border luminance can be changed based on the subtitles luminance information. Accordingly, as shown in FIG. 15, dynamic tone mapping having an even higher degree of freedom can be applied to the main video. FIG. 15 shows a case where the actual subtitles luminance is 100 nits. As shown in FIG. 15, in this case, dynamic tone mapping having an even higher degree of freedom can be implemented as compared with the case where processing is performed by fixing the border luminance level to 200 nits as shown in FIG. 14B. Such an advantageous effect increases as the maximum luminance of video display apparatus 102 to which the video reproduction apparatus is connected is lower.

[3-3. Detailed Configuration Example]

In the present embodiment, video reproduction apparatus 101 is configured to embed the graphics luminance information of the graphics to be overlaid on the main video into a portion of the dynamic metadata. Thus, an example of the method for embedding the information will be described.

In the case of reproducing a video on a packaged medium such as a Blu-ray disc, one continuous reproduction path is defined in a file called a playlist and recorded on the disc. In the playlist, reproduction management information such as which of the video streams on the disc is to be reproduced, the start position and the end position of the video stream to be reproduced, and reproduction duration is recorded.

In the playlist, graphics luminance information of the graphics displayed together with the main video, or upper limit information of the luminance range is recorded. With this configuration, video reproduction apparatus 101 can easily acquire the graphics luminance information of the graphics displayed together with the main video, or the upper limit information of the luminance range, and transmit the acquired information to video display apparatus 102.

The graphics luminance information may include subtitles luminance information and menu luminance information. Also, in the case where subtitles or a menu can be selected from a plurality of languages or a plurality of versions, the graphics luminance information may include a plurality of subtitles luminance information or a plurality of menu luminance information corresponding to the plurality of languages or the plurality of versions. In this case, the plurality of subtitles luminance information or the plurality of menu luminance information may be recorded in the playlist.

Furthermore, the graphics luminance information may indicate not only the maximum luminance during reproduction of the playlist, but also the maximum luminance per scene or per unit time, together with the reproduction time information.

The graphics luminance information stored in the playlist may be MaxSLL shown in FIG. 15. MaxSLL is at least one of the graphics maximum luminance of the graphics to be overlaid on the main video and the minimum luminance of dynamic tone mapping on the main video.

The details of Blu-ray and Ultra HD Blu-ray are disclosed in, for example, Non-Patent Literature (NPL) 1.

As described above, in the present embodiment, tone mapping processor 123A sets the border luminance according to the graphics luminance. As a result, an appropriate border luminance can be set according to the type of graphics or the like, and it is therefore possible to expand the luminance range to which dynamic tone mapping can be applied.

4. Embodiment 3

In addition to the processing of video display apparatus 102 of Embodiment 1, video display apparatus 102 according to the present embodiment detects the position of graphics overlaid on the main video by using an inter-frame correlation or the like. Video display apparatus 102 performs tone mapping that does not vary with time on the pixels where graphics are overlaid, without performing dynamic tone mapping. With this configuration, the influence of dynamic tone mapping on the graphics can be reduced.

Hereinafter, a configuration of video display system 100 according to the present embodiment will be described. Video reproduction apparatus 101 has the same configuration as that of Embodiment 1. Video reproduction apparatus

101 does not need to have a function of transmitting the graphics overlay flag to video display apparatus 102.

Figure 16:
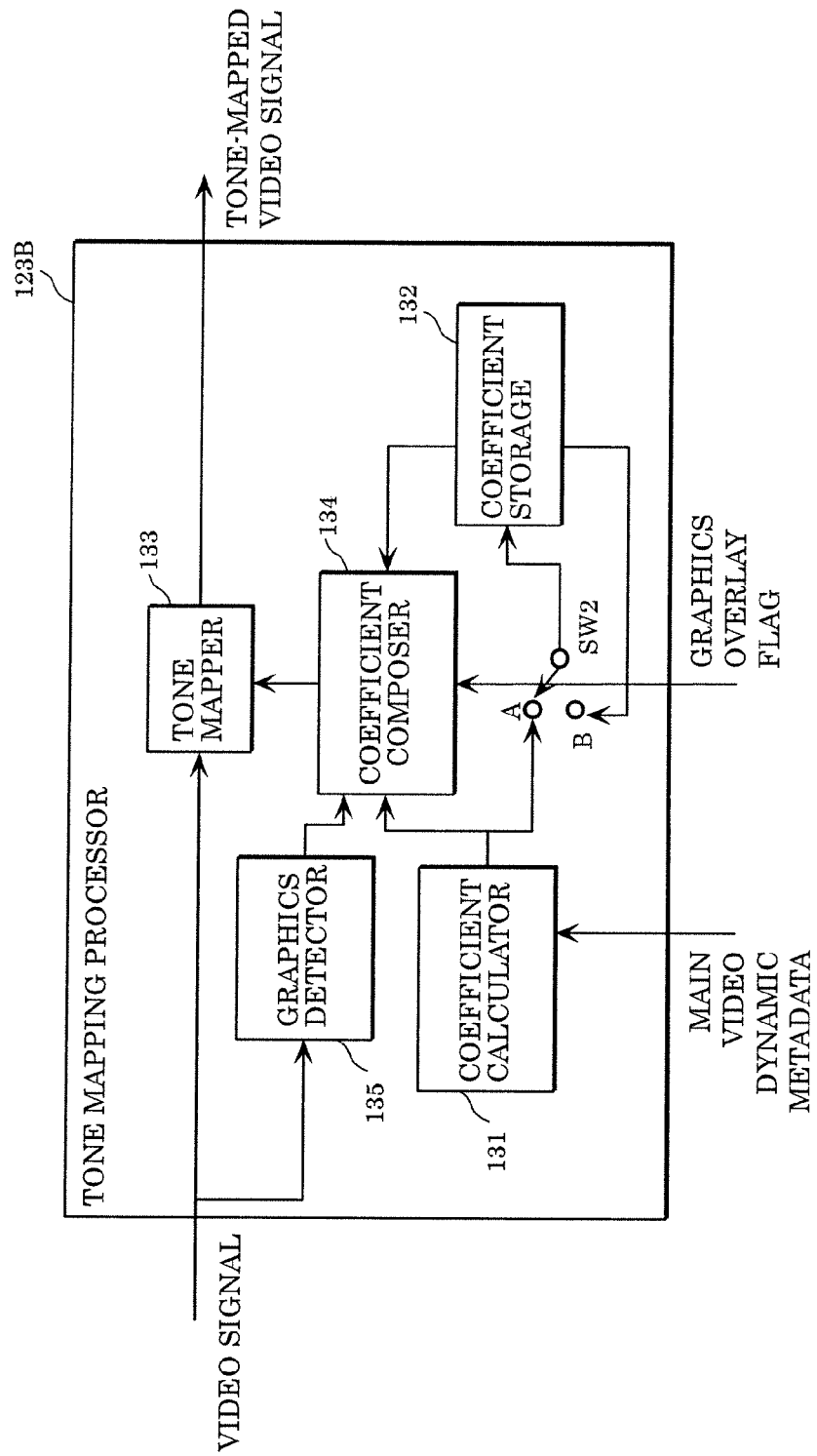
FIG. 16 is a block diagram of a tone mapping processor according to Embodiment 3.

Tone mapping processor 123B included in video display apparatus 102 has a configuration different from that of Embodiment 1. FIG. 16 is a block diagram showing a configuration of tone mapping processor 123B according to the present embodiment. Tone mapping processor 123B shown in FIG. 16 includes graphics detector 135 in addition to the structural elements of tone mapping processor 123A shown in FIG. 10.

A video signal is input to graphics detector 135. Graphics detector 135 detects the positions of pixels on which graphics are overlaid by using an inter-frame correlation or the like. Then, graphics detector 135 outputs per-pixel information that indicates whether graphics are overlaid to coefficient composer 134.

In the case where the graphics overlay flag is set to ON, with respect to the pixels where graphics are not overlaid, coefficient composer 134 outputs the tone mapping coefficient calculated based on the main video dynamic metadata to tone mapper 133. With respect to the pixels on which graphics are overlaid, coefficient composer 134 outputs the tone mapping coefficient that does not vary with time to tone mapper 133.

Also, in the case where the graphics overlay flag is not transmitted from video reproduction apparatus 101, coefficient composer 134 performs processing of composing a tone mapping coefficient by using the per-pixel information that indicates whether graphics are overlaid, which was detected by graphics detector 135. That is, coefficient composer 134 may generate a graphics overlay flag based on the output signal of graphics detector 135.

For example, if graphics detector 135 detects that graphics are present on one or a pre-set number of pixels in a frame or a frame group to be processed, coefficient composer 134 sets the graphics overlay flag to ON and performs processing, assuming that graphics are overlaid.

In this case, tone mapper 133 performs processing by taking into consideration a time delay due to the processing time of graphics detector 135. For example, the time delay is set in tone mapper 133 in advance.

Also, tone mapper 133 may determine that graphics are present if it is determined that the number of pixels detected as graphics exceeds a threshold value. With this configuration, it is possible to suppress an erroneous detection of graphics. The threshold value may be changed by a user.

As described above, tone mapping processor 123B detects a graphics region in the video where graphics are overlaid, and then performs the second tone mapping process on the graphics region and performs the first tone mapping process on a region in the video other than the graphics region. With this configuration, tone mapping can be fixed with respect to the graphics, and dynamic tone mapping can be performed on a region other than the graphics.

5. Embodiment 4

Unlike Embodiment 1, the present embodiment is configured such that video reproduction apparatus 101A does not generate the graphics overlay flag, and video display apparatus 102 does not have the function of changing dynamic tone mapping based on the graphics overlay flag. Instead, video reproduction apparatus 101A performs processing of converting the graphics luminance.

Specifically, maximum luminance information of video display apparatus 102 connected to video reproduction apparatus 101A is set in video reproduction apparatus 101A. Video reproduction apparatus 101A changes the graphics luminance of graphics to be overlaid according to the maximum luminance information so as to minimize the influence of tone mapping performed in video display apparatus 102. With this configuration, the influence of dynamic tone mapping on the overlaid graphics can be reduced.

Video reproduction apparatus 101A may acquire the maximum luminance information of video display apparatus 102 from settings set by an operator, or may acquire the same from video display apparatus 102 based on EDID stored in HDMI connected to video reproduction apparatus 101A. There are various methods for tone mapping performed in video display apparatus 102, and thus video reproduction apparatus 101A adjusts the graphics luminance within a predetermined range. Video reproduction apparatus 101A may perform the adjustment based on an operation performed by an operator, or based on information acquired from the database of each video display apparatus 102.

Figure 17:
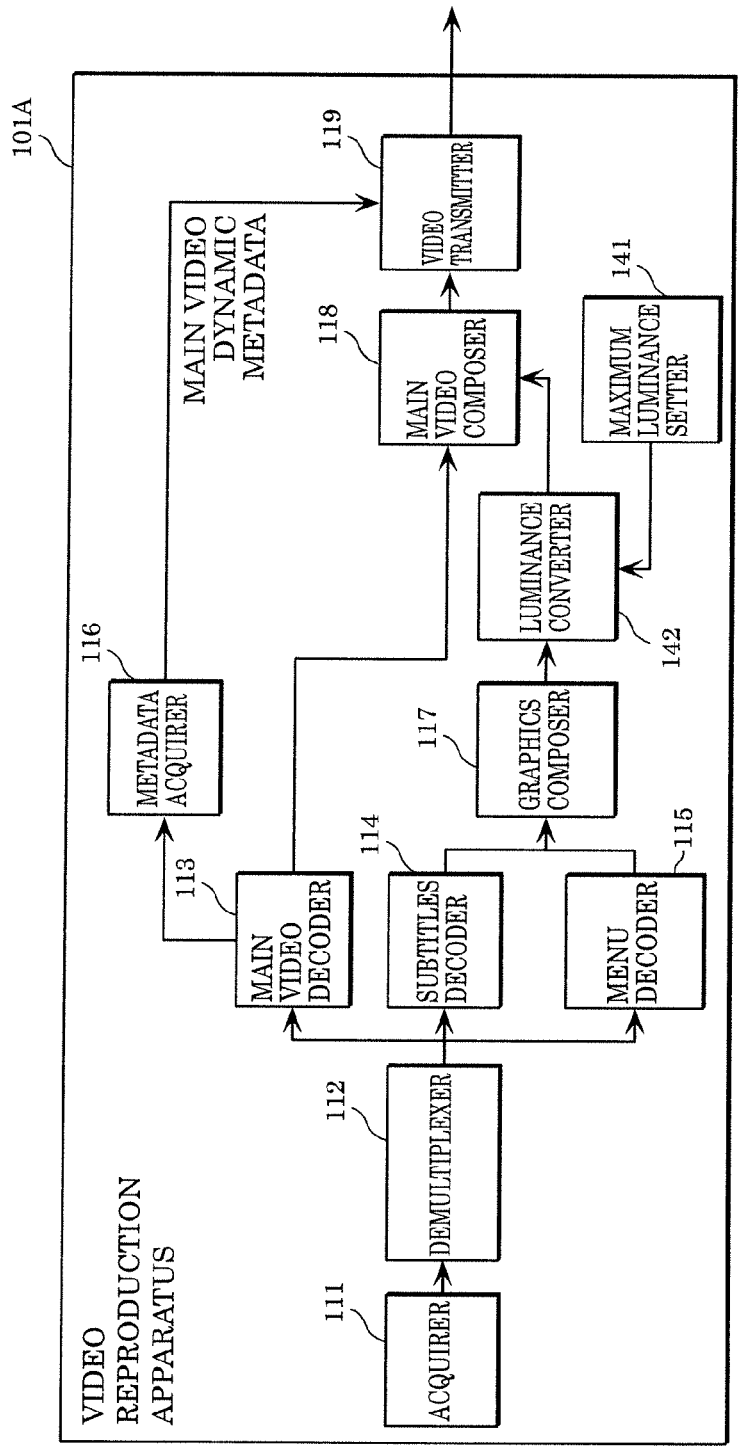
FIG. 17 is a block diagram of a video reproduction apparatus according to Embodiment 4.

Hereinafter, a configuration of video reproduction apparatus 101A according to the present embodiment will be described. FIG. 17 is a block diagram showing the configuration of video reproduction apparatus 101A according to the present embodiment. Video reproduction apparatus 101A shown in FIG. 17 includes maximum luminance setter 141 and luminance converter 142 in addition to the structural elements of video reproduction apparatus 101 according to Embodiment 1.

Maximum luminance setter 141 acquires and stores the maximum luminance information of video display apparatus 102. For example, the maximum luminance information may be set based on an operation performed by a user, or may be acquired via a video signal transmission apparatus as attribute information of video display apparatus 102 connected to video reproduction apparatus 101A. For example, maximum luminance setter 141 may acquire the maximum luminance information of video display apparatus 102 as EDID of HDMI. Alternatively, maximum luminance setter 141 may acquire the attribute information of video display apparatus 102 from a database in a server on a network.

The graphics information generated by graphics composer 117 is input to luminance converter 142. Luminance converter 142 converts the luminance of the graphics information based on the maximum luminance information of video display apparatus 102 stored in maximum luminance setter 141, and transmits the graphics information that has undergone conversion to main video composer 118. Main video composer 118 overlays the graphics information that has undergone conversion on the main video.

For example, in the case where the maximum luminance of video display apparatus 102 is 500 nits, and the maximum luminance of the graphics information is 300 nits, luminance converter 142 converts the maximum luminance of the graphics information to 250 nits, which is 50% of the maximum luminance of video display apparatus 102. As a result, it is possible to reduce the influence of tone mapping in video display apparatus 102.

The conversion condition and proportion (50% described above) are not limited to those described above. Also, these may be changed by a user, or may be changed according to the characteristics of video display apparatus 102 to which the video reproduction apparatus is connected.

As described above, video display system 100 according to the present embodiment includes display 124, luminance converter 142 that generates a second video by converting the luminance of a first video according to the maximum luminance of display 124, and tone mapping processor 123 that performs a tone mapping process of generating a third video by converting the luminance of the second video by using conversion characteristics according to the maximum luminance of the second video. Display 124 displays the third video. With this configuration, it is possible to suppress a luminance variation caused by variation of tone mapping.

Specifically, luminance converter 142 generates the second video by converting the luminance of graphics included in the first video according to the maximum luminance of display 124. With this configuration, it is possible to suppress a variation in the luminance of the graphics.

6. Embodiment 5

Unlike Embodiment 4, the present embodiment is configured such that video reproduction apparatus 101B assumes a dynamic tone mapping method in video display apparatus 102, and performs, on graphics to be overlaid, inverse conversion of the dynamic tone mapping in video display apparatus 102 before the graphics are overlaid. With this configuration, after dynamic tone mapping has been performed, the overlaid graphics can be displayed at the original luminance and color of the graphics.

For example, video reproduction apparatus 101B assumes the dynamic tone mapping method in video display apparatus 102 to which video reproduction apparatus 101B is connected, by using the following means. Video reproduction apparatus 101B assumes the dynamic tone mapping method simply based on video luminance information corresponding to, for example, 90% of the maximum luminance of video display apparatus 102 as the maximum luminance that is free from influence. To be more specific, video reproduction apparatus 101B acquires the dynamic tone mapping method in video display apparatus 102 from a database. Alternatively, video reproduction apparatus 101B may perform measurement by using a test pattern, and estimates the dynamic tone mapping method based on the result of measurement.

Figure 18:
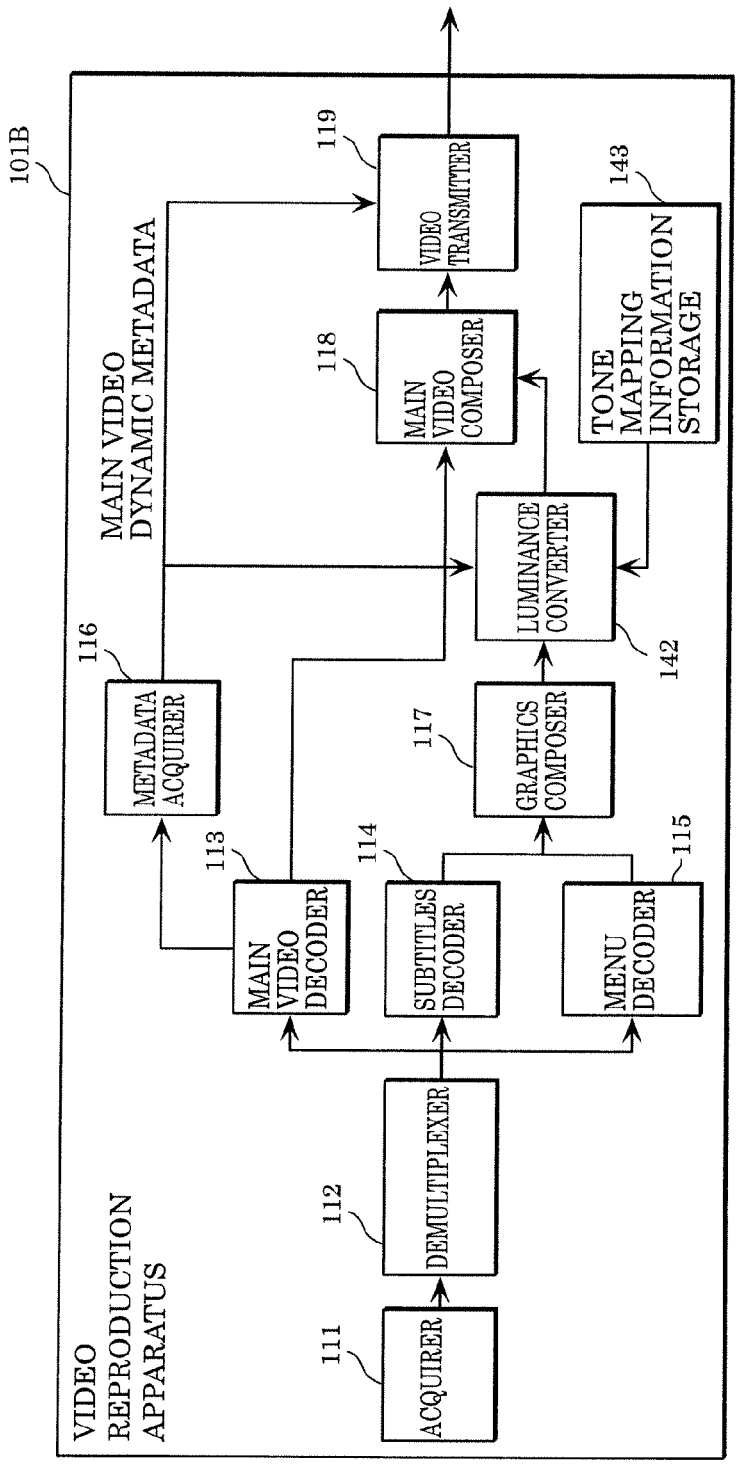
FIG. 18 is a block diagram of a video reproduction apparatus according to Embodiment 5.

Hereinafter, a configuration of video reproduction apparatus 101A according to the present embodiment will be described. FIG. 18 is a block diagram showing a configuration of video reproduction apparatus 101B according to the present embodiment.

Video reproduction apparatus 101B shown in FIG. 18 is different from video reproduction apparatus 101A according to Embodiment 4 shown in FIG. 17 in that video reproduction apparatus 101B includes tone mapping information storage 143 in place of maximum luminance setter 141. Also, the main video dynamic metadata output from metadata acquirer 116 is transmitted to luminance converter 142.

Tone mapping information storage 143 stores tone mapping information related to the tone mapping process performed in video display apparatus 102. Luminance converter 142 performs, on the graphics information, inverse conversion of the tone mapping performed in video display apparatus 102 by using the tone mapping information and the main video dynamic metadata, and outputs the graphics information that has undergone the inverse conversion to main video composer 118. Main video composer 118 overlays, on the main video, the graphics that have undergone the inverse conversion of the tone mapping.

With this configuration, when tone mapping is performed in video display apparatus 102 that has received a video signal, the graphics portion that has undergone the inverse conversion of the tone mapping is displayed as original graphics. Accordingly, the influence of tone mapping of video display apparatus 102 can be reduced.

Figure 19:
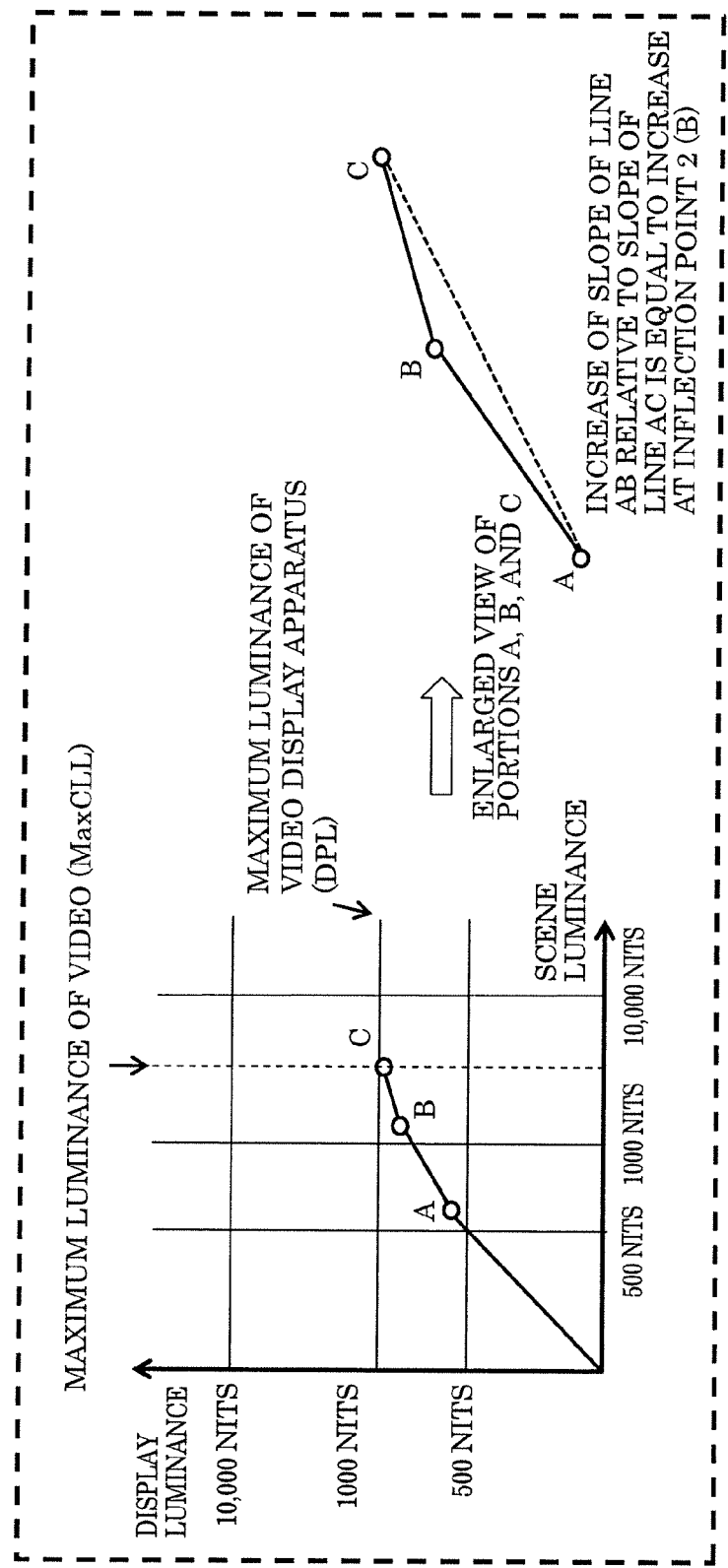
FIG. 19 is a diagram showing an example of tone mapping according to Embodiment 5.

FIG. 19 a diagram showing an example of tone mapping used in video display apparatus 102. FIG. 20 is a diagram showing an example of tone mapping information used in this case. For example, the tone mapping information includes the luminance information of video display apparatus 102 and the tone mapping information of video display apparatus 102. The luminance information of video display apparatus 102 indicates the maximum luminance of video display apparatus 102 and the maximum full-display luminance that is the maximum luminance that can be displayed simultaneously in all pixels. Also, the tone mapping information of video display apparatus 102 indicates inflection points in the tone mapping, and indicates, for example, luminance values at the inflection points or an increase of a slope between inflection points.

The configuration of the tone mapping information is not limited to that described above. For example, the tone mapping information may include only a portion of information shown in FIG. 20.

The condition or proportion (for example, 90% described above) of the inverse conversion of the tone mapping in video display apparatus 102 may be changed by a user, or may be changed for each video display apparatus 102 to which the video reproduction apparatus is connected.

Also, video reproduction apparatus 101B may acquire the tone mapping information of video display apparatus 102 from settings set by a user, or may acquire via a video signal transmission apparatus as attributes of video display apparatus 102 connected to video reproduction apparatus 101B. For example, video reproduction apparatus 101B may acquire the tone mapping information as EDID of HDMI. Alternatively, video reproduction apparatus 101B may acquire the attribute information of video display apparatus 102 to which video reproduction apparatus 101B is connected from a database in a server on a network.

As described above, video display system 100 according to the present embodiment includes luminance converter 142 that generates a second video by converting the luminance of a first video, tone mapping processor 123 that performs a tone mapping process of generating a third video by converting the luminance of the second video by using conversion characteristics according to the maximum luminance of the second video, and display 124 that displays the third video. Luminance converter 142 converts the luminance of the first video according to the tone mapping process performed by tone mapping processor 123. With this configuration, it is possible to suppress a luminance variation caused by variation of tone mapping.

Specifically, luminance converter 142 converts the luminance of the first video based on the maximum luminance of the first video and the conversion characteristics used in the tone mapping process performed by tone mapping processor 123.

7. Variation

The HDR video acquired by acquirer 111 may be a video on, for example, a Blu-ray disc, a DVD, a moving image delivery site on the Internet, a broadcast, or a HDD (Hard Disk Drive).

The video reproduction apparatus described above may be an apparatus that decodes a compressed video signal transmitted from a recording medium, a broadcast, or the Internet, and transmits the decoded video signal to a video display apparatus. Examples of the video reproduction apparatus include a disc player, a disc recorder, a set top box, a television set, a personal computer, and a smartphone. Also, video display apparatus 102 may have some or all of the functions of the video reproduction apparatus. For example, among the processors included in the video reproduction apparatus, video display apparatus 102 may include the processors other than acquirer 111. Also, video receiver 121, metadata acquirer 122, and tone mapping processor 123 included in video display apparatus 102 may be incorporated in the video reproduction apparatus. Also, among the processors included in tone mapping processor 123, the video reproduction apparatus may include the processors other than tone mapper 133.

The video signal transmitting means that transmits the video signal from the video reproduction apparatus to the video display apparatus may be a means that transmits the video signal in an uncompressed state such as HDMI, DVI, or DP, or may be a means that transmits the video signal in a compressed form such as transmission via a network.

The maximum luminance information or the tone mapping information of the video display apparatus can be set in the video reproduction apparatus by a user inputting the information into the video reproduction apparatus via a remote controller or the like, or via an operating apparatus included in the video reproduction apparatus. Alternatively, the user may acquire these information via the Internet or any other means, store the acquired information in a portable storage medium, and transmit the information to the video reproduction apparatus via the portable storage medium. Alternatively, the video reproduction apparatus may be connected directly to the Internet such that the video reproduction apparatus can acquire these information from a database on a server. Furthermore, the video reproduction apparatus may display a test pattern on the video display apparatus such that these information can be acquired or stored, with the user confirming the characteristics of the video display apparatus by using the displayed test pattern.

In Embodiment 5, an example has been shown in which the tone mapping information of the video display apparatus is defined by two inflection points, but may be defined by three or more inflection points, or may be defined by a curved line.

The video reproduction apparatus may generate graphics luminance information (including subtitles luminance information and menu luminance information) by detecting the luminance of graphics (subtitles or a menu) from the data of the graphics, or may acquire the luminance of graphics created in advance during production of the video data. For example, the graphics luminance may be recorded in a disc, or may be transmitted as metadata via broadcasting or the Internet. The video reproduction apparatus reads the graphics luminance, and transmits the read graphics luminance to the video display apparatus as a portion of the dynamic metadata. Alternatively, the luminance information of graphics (subtitles or a menu) may be recorded in a database on a server that is connected to the Internet as information regarding the content to be reproduced such that the video reproduction apparatus can acquire the graphics luminance information from the database, and transmit the acquired graphics luminance information to the video display apparatus.

Up to here, the video display systems according to the embodiments of the present disclosure have been described, but the present disclosure is not limited to the embodiments.

Also, the processors included in the video display systems according to the embodiments described above are typically implemented as LSIs, which are integrated circuits. They may be individual single chips, or a part or all of them may be configured in a single chip.

Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, in each of the embodiments described above, the structural elements may be configured using dedicated hardware, or may be implemented by executing a software program suitable for the structural elements. The structural elements may be implemented by a program executor such as a CPU or a processor reading and executing a software program recorded in a recording medium such as a hard disk or a semiconductor memory.

Also, the present disclosure may be implemented as a method executed by the video display system.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the order in which the steps of each flowchart are performed is merely an example provided to specifically describe the present disclosure. Accordingly, the order is not limited to that described above. Also, one or more of the steps described above may be performed simultaneously with (in parallel to) other steps.

A video display system according to one or more aspects has been described by way of embodiments above, but the present disclosure is not limited to the embodiments given above. Embodiments obtained by making various modifications that can be conceived by a person having ordinary skill in the art to the above embodiments as well as embodiments implemented by any combination of the structural elements of different embodiments without departing from the gist of the present disclosure may also be encompassed within the scope of one or more aspects.

INDUSTRIAL APPLICABILITY

The present disclosure is applicable to a video display system, a video reproduction apparatus, or a video display apparatus.

The invention claimed is:

1. A video display apparatus, comprising:
a tone mapping processor that performs a tone mapping process of converting a luminance of a video by using conversion characteristics according to a maximum luminance of the video; and
a display that displays the video that has undergone the tone mapping process, wherein,
when the video does not contain graphics, the tone mapping processor performs, on all pixels of an entire screen, a first tone mapping process of dynamically changing the conversion characteristics according to a time-dependent change in the maximum luminance of the video,
when the video contains graphics, the tone mapping processor performs, on all the pixels of the entire screen, a second tone mapping process using constant conversion characteristics irrespective of the change in the maximum luminance of the video, and the tone mapping processor determines which of the first tone mapping process and the second tone mapping process is to be performed on all the pixels of the entire screen according to a first flag that indicates, for each frame unit, which of the first tone mapping process and the second tone mapping process is to be performed.

2. The video display apparatus according to claim 1, wherein the first flag includes a second flag that indicates whether or not the video contains subtitles and a third flag that indicates whether or not the video contains a menu.

3. The video display apparatus according to claim 1, wherein the tone mapping processor switches between the first tone mapping process and the second tone mapping process, and
when switching from the first tone mapping process to the second tone mapping process, the tone mapping processor continuously uses the conversion characteristics used immediately before the switching in the second tone mapping process.

4. The video display apparatus according to claim 1, wherein, in the second tone mapping process,
with respect to a luminance greater than or equal to a border luminance level, the tone mapping processor dynamically changes the conversion characteristics according to the time-dependent change in the maximum luminance of the video, and
with respect to a luminance less than the border luminance level, the tone mapping processor uses the constant conversion characteristics irrespective of the change in the maximum luminance of the video.

5. The video display apparatus according to claim 4, wherein the tone mapping processor sets the border luminance level according to a luminance of the graphics.

6. The video display apparatus according to claim 1, wherein the tone mapping processor performs the first tone mapping process when graphics to be overlaid on the video are not present, and performs the second tone mapping process when graphics to be overlaid on the video are present.

7. A video display method in a video display apparatus, the video display method comprising:
performing a tone mapping process of converting a luminance of a video by using conversion characteristics according to a maximum luminance of the video;
displaying the video that has undergone the tone mapping process, wherein, in the tone mapping process,
when the video does not contain graphics, a first tone mapping process of dynamically changing the conversion characteristics according to a time-dependent change in the maximum luminance of the video is performed on all the pixels of the entire screen, and
when the video contains graphics, a second tone mapping process is performed on all the pixels of the entire screen using constant conversion characteristics irrespective of the change in the maximum luminance of the video; and
determining which of the first tone mapping process and the second tone mapping process is to be performed on all the pixels of the entire screen according to a first flag that indicates, for each frame unit, which of the first tone mapping process and the second tone mapping process is to be performed.

* * * * *